(12) United States Patent
Pezeshki et al.

(10) Patent No.: US 11,728,925 B2
(45) Date of Patent: Aug. 15, 2023

(54) DETERMINING OVERLAY CODES FOR TRANSMISSION OF REFERENCE SIGNALS

(71) Applicant: QUALCOMM Incorporated, San Diego, CA (US)

(72) Inventors: Hamed Pezeshki, San Diego, CA (US); Tao Luo, San Diego, CA (US); Mahmoud Taherzadeh Boroujeni, San Diego, CA (US); Sony Akkarakaran, Poway, CA (US); Hua Wang, Basking Ridge, NJ (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 17/142,172

(22) Filed: Jan. 5, 2021

(65) Prior Publication Data

US 2022/0216938 A1 Jul. 7, 2022

(51) Int. Cl.
  *H04W 72/04* (2023.01)
  *H04L 5/00* (2006.01)
  *H04L 1/00* (2006.01)
  *G06N 3/04* (2023.01)
  *G06N 3/08* (2023.01)
  *H04W 72/044* (2023.01)

(52) U.S. Cl.
  CPC .......... *H04L 1/0036* (2013.01); *G06N 3/04* (2013.01); *G06N 3/08* (2013.01); *H04L 5/0048* (2013.01); *H04W 72/044* (2013.01)

(58) Field of Classification Search
  None
  See application file for complete search history.

(56) References Cited

U.S. PATENT DOCUMENTS

| | | | |
|---|---|---|---|
| 2010/0260154 A1* | 10/2010 | Frank | G01S 5/10 370/336 |
| 2010/0278047 A1* | 11/2010 | Koorapaty | H04W 36/385 455/63.1 |
| 2016/0127102 A1 | 5/2016 | Kim et al. | |

(Continued)

FOREIGN PATENT DOCUMENTS

WO 2018053009 A1 3/2018

OTHER PUBLICATIONS

International Search Report and Written Opinion—PCT/US2021/072790—ISA/EPO—dated Mar. 25, 2022.

*Primary Examiner* — Sai Aung

(74) *Attorney, Agent, or Firm* — Polsinelli LLP

(57) ABSTRACT

Disclosed are techniques for determining tone patterns and associated overlay codes for transmission of reference signals. A tone pattern (e.g., with each tone pattern occupying a resource element in a resource block) can be determined for a reference signal for use in wireless communications between a receiving device and a transmitting device. The tone pattern can include an irregular combination of resource elements in one or more resource blocks for the reference signal. The resource elements can be shared by a plurality of antennas for communication of one or more reference signals between at least the user equipment and the base station. An overlay code may be determined for the tone pattern. Information associated with the transmission of the reference signal using the tone pattern and the overlay code may be communicated by the receiving device.

30 Claims, 17 Drawing Sheets

(56) References Cited

U.S. PATENT DOCUMENTS

2018/0115382 A1\* 4/2018 Manolakos ............ H04B 7/066
2018/0278395 A1 9/2018 Yoon
2018/0367279 A1\* 12/2018 Hellge ................. H04L 5/0053
2019/0327320 A1\* 10/2019 Rubin .................. H04L 67/562
2019/0334751 A1\* 10/2019 Liu ...................... H04L 5/0048
2020/0053765 A1\* 2/2020 Chien ................. H04W 72/042
2022/0216938 A1\* 7/2022 Pezeshki ................. G06N 3/04

\* cited by examiner

1000

Determine, By A Receiving Device, A Tone Pattern For A Reference Signal For Use In Wireless Communications Between The Receiving Device And A Transmitting Device, The Tone Pattern Including An Irregular Combination Of Resource Elements In One Or More Resource Blocks For The Reference Signal, Wherein The Resource Elements Are Shared By A Plurality Of Antennas For Communication Of One Or More Reference Signals Between At Least The Transmitting Device And The Receiving Device
1010

Determine, By The Receiving Device, An Overlay Code For The Tone Pattern
1020

Communicate, By The Receiving Device, Information Associated With The Transmission Of The Reference Signal Using The Tone Pattern And The Overlay Code
1030

FIG. 10

DETERMINING OVERLAY CODES FOR TRANSMISSION OF REFERENCE SIGNALS

FIELD OF THE DISCLOSURE

Aspects of the disclosure relate generally to wireless communications. In some implementations, examples are described for determining tone patterns and corresponding overlay codes for transmission of reference signals between a base station and a user equipment (UE) device.

BACKGROUND OF THE DISCLOSURE

Wireless communication systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and most recently a fifth-generation (5G) service. There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

The fifth-generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users with, for example, a gigabit connection speeds to tens of users in a common location, such as on an office floor. Several hundreds of thousands of simultaneous connections are to be supported in order to support large sensor deployments. Consequently, there is a need for significantly enhancing the spectral efficiency of 5G mobile communications compared to the current 4G/LTE standard. Furthermore, there is also a corresponding need for enhancing signaling efficiencies and substantially reducing latency compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods, and computer-readable media for determination of tone patterns and corresponding overlay codes (which may also be referred to as cover codes, Orthogonal Cover Codes (OCC), and/or OCC pattern) for resource elements utilized over a physical layer to transmit reference signals between a user equipment and a base station.

According to at least one example, a method of wireless communication is provided that includes: determining, by a receiving device, a tone pattern for a reference signal for use in wireless communications between the receiving device and a transmitting device, the tone pattern including an irregular combination of resource elements in one or more resource blocks for the reference signal, wherein the resource elements are shared by a plurality of antennas for communication of one or more reference signals between at least the transmitting device and the receiving device; determining, by the receiving device, an overlay code for the tone pattern; and communicating, by the receiving device, information associated with transmission of the reference signal using the tone pattern and the overlay code.

In another example, an apparatus for wireless communication is provided that includes one or more memories having computer-readable instructions stored therein, and one or more processors. The one or more processors are configured to execute the computer-readable instructions to: determine a tone pattern for a reference signal for use in wireless communications between the apparatus and a transmitting device, the tone pattern including an irregular combination of resource elements in one or more resource blocks for the reference signal, wherein the resource elements are shared by a plurality of antennas for communication of one or more reference signals between at least the transmitting device and the receiving device; determine an overlay code for the tone pattern; and communicate information associated with transmission of the reference signal using the tone pattern and the overlay code.

In another example, a non-transitory computer-readable medium is provided that includes stored thereon at least one instruction that, when executed by one or more processors, cause the one or more processors to: determine a tone pattern for a reference signal for use in wireless communications between a receiving device and a transmitting device, the tone pattern including an irregular combination of resource elements in one or more resource blocks for the reference signal, wherein the resource elements are shared by a plurality of antennas for communication of one or more reference signals between at least the transmitting device and the receiving device; determine an overlay code for the tone pattern; and communicate information associated with transmission of the reference signal using the tone pattern and the overlay code.

In another example, an apparatus for wireless communication is provided that includes: means for determining, by a receiving device, a tone pattern for a reference signal for use in wireless communications between the receiving device and a transmitting device, the tone pattern including an irregular combination of resource elements in one or more resource blocks for the reference signal, wherein the resource elements are shared by a plurality of antennas for communication of one or more reference signals between at least the transmitting device and the receiving device; means for determining, by the receiving device, an overlay code for the tone pattern; and means for communicating, by the receiving device, information associated with transmission of the reference signal using the tone pattern and the overlay code.

In another example, a method of wireless communication is provided that includes: determining, by a user equipment, a tone pattern for a reference signal for use in wireless communications between the user equipment and a base station, the tone pattern including an irregular combination of resource elements in one or more resource blocks for the reference signal, wherein the resource elements are shared by a plurality of antennas for communication of one or more reference signals between at least the user equipment and the base station; transmitting, by the user equipment, the tone pattern to the base station; receiving, by the user equipment from the base station, an overlay code for the tone pattern; and communicating, by the user equipment, the reference signal using the tone pattern and the overlay code.

In another example, an apparatus for wireless communication is provided that includes one or more memories having computer-readable instructions stored therein, and one or more processors. The one or more processors are configured to execute the computer-readable instructions to determine a tone pattern for a reference signal for use in wireless communications between the apparatus and a base station, the tone pattern including an irregular combination of resource elements in one or more resource blocks for the reference signal, wherein the resource elements are shared by a plurality of antennas for communication of one or more reference signals between at least the apparatus and the base station; transmit the tone pattern to the base station; receive, from the base station, an overlay code for the tone pattern; and communicate the reference signal using the tone pattern and the overlay code.

In another example, a non-transitory computer-readable medium is provided that includes stored thereon at least one instruction that, when executed by one or more processors, cause the one or more processors to: determine a tone pattern for a reference signal for use in wireless communications between the apparatus and a base station, the tone pattern including an irregular combination of resource elements in one or more resource blocks for the reference signal, wherein the resource elements are shared by a plurality of antennas for communication of one or more reference signals between at least the apparatus and the base station; transmit the tone pattern to the base station; receive, from the base station, an overlay code for the tone pattern; and communicate the reference signal using the tone pattern and the overlay code.

In another example, an apparatus for wireless communication is provided that includes: means for determining, by a user equipment, a tone pattern for a reference signal for use in wireless communications between the user equipment and a base station, the tone pattern including an irregular combination of resource elements in one or more resource blocks for the reference signal, wherein the resource elements are shared by a plurality of antennas for communication of one or more reference signals between at least the user equipment and the base station; means for transmitting, by the user equipment, the tone pattern to the base station; means for receiving, by the user equipment from the base station, an overlay code for the tone pattern; and means for communicating, by the user equipment, the reference signal using the tone pattern and the overlay code.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 10 is a flow chart illustrating an example of a process of communicating a customized tone pattern and associated overlay codes, in accordance with some aspects of the present disclosure.

DETAILED DESCRIPTION

Figure 1:
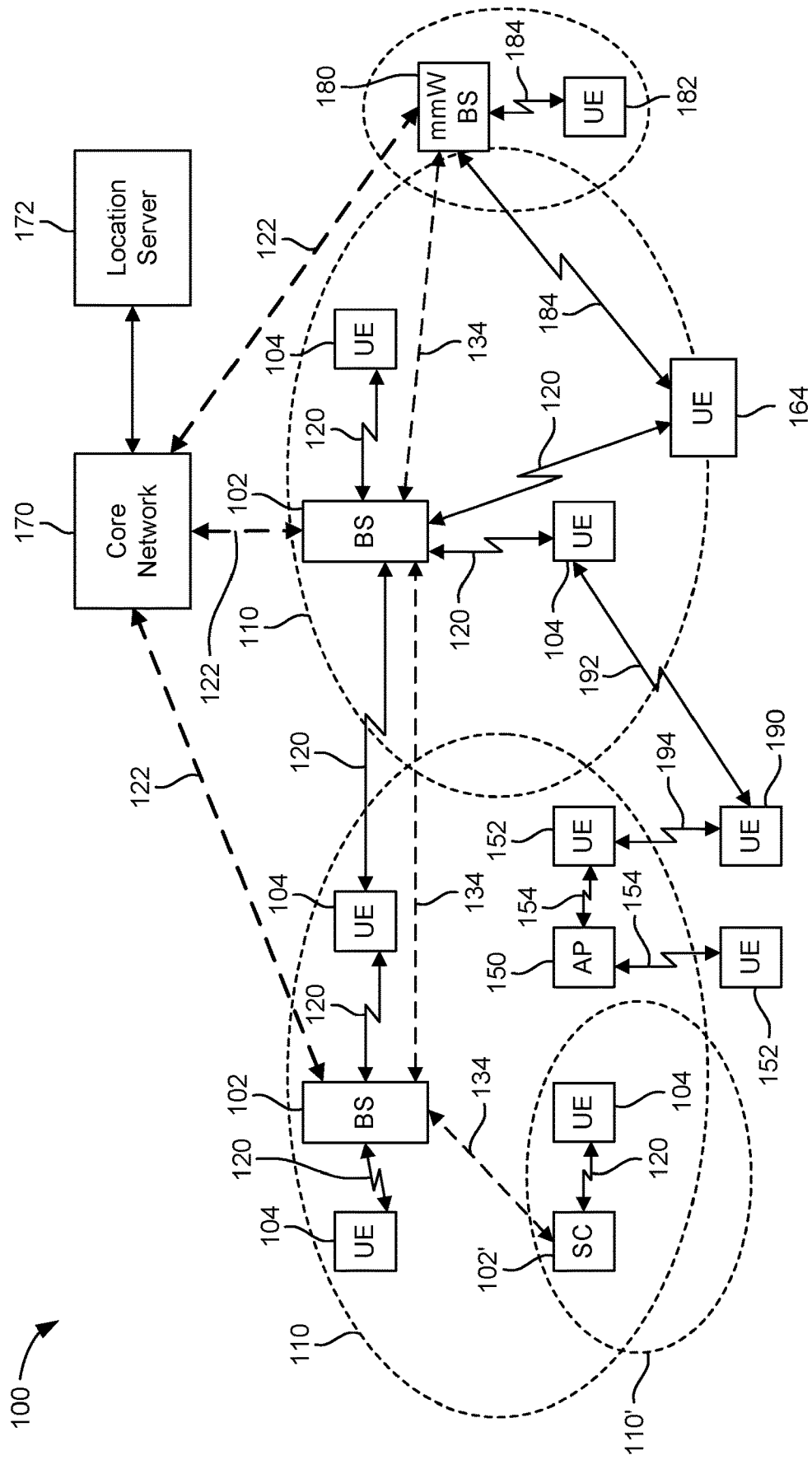
FIG. 1 is a diagram illustrating an example wireless communications system, in accordance with some aspects of the present disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

Systems, apparatuses, processes (also referred to as methods), and computer-readable media (collectively referred to herein as systems and techniques) are described herein for determining optimized tone patterns and/or overlay codes for resource elements utilized over a physical layer to transmit reference signals between a base station (e.g., a 4G/LTE eNodeB, a 5G/new radio (NR) gNodeB, and/or other base station) and a user equipment (UE) device (referred to herein as a UE).

As noted above, 5G mobile standard calls for higher data transfer speeds, greater numbers of connections, and better coverage, among other improvements. 5G is expected to support several hundreds of thousands of simultaneous connections. Consequently, there is room to improve the spectral efficiency of 5G mobile communications by enhancing signaling efficiencies and reducing latency. One aspect where such signaling efficiency and reduction in latency can be achieved is the communication of various uplink and downlink reference signals between user equipment and their respective serving base stations.

Reference signals are predefined signals occupying specific resource elements within a time-frequency grid of a resource block and may be exchanged on one or both of downlink and uplink physical communication channels. Each reference signal has been defined by the $3^{rd}$ Generation Partnership Project (3GPP) for a specific purpose such as channel estimation, phase-noise compensation, acquiring downlink/uplink channel state information, time and frequency tracking, etc.

Example reference signals include, but are not limited to, Channel State Information-Reference Signal (CSI-RS), De-Modulation Reference Signal (DMRS), Sounding Reference Signal (SRS), among others. Some reference signals such as CSI-RS are downlink specific signals, while others such as DMRS are sent both on downlink and uplink communication channels. There are also uplink specific reference signals defined by the 3GPP.

Tone patterns can be defined as specific arrangements of resource elements in a given resource block for transmission of a reference signal. Tone patterns are currently pre-defined in the 5G communication standards and are known to both the user equipment and corresponding base station. Pre-defined tone patterns may not be optimized for all environments. For instance, the arrangement or combination of resource elements used for transmission of a DMRS are typically grouped together and front-loaded into a resource block.

The systems and techniques described herein can dynamically determine (or configure) optimized tone patterns for different resource elements of resource blocks used at the physical layer for transmission of various uplink and downlink reference signals between one or more UEs and their respective serving base stations. Determining the optimized tone patterns improves signal and spectral efficiency, and can reduce overhead associated with the transmission of reference signals, etc. (e.g., in 5G mobile systems).

Furthermore, in cases where Frequency Division Multiplexing (FDM) is used (e.g., in Single-User (SU) Multiple-Input Multiple-Output (MIMO) (SU-MIMO), Multi-User MIMO (MU-MIMO) systems), resource elements are shared by two or more antenna ports. In such cases, an Orthogonal Cover Code (OCC) can be used to recover (e.g., decode by decoding the OCC) the received reference signal (e.g., DMRS) by a receiving device (e.g., the base station or the user equipment, such as by a receiving antenna, modem, and/or other component of the base station or user equipment). In some examples, the systems and techniques described herein can dynamically determine corresponding OCCs using various methods described below. An OCC may also be referred to herein as overlay code and/or OCC pattern.

In some examples, as described in more detail below, dynamic determination of tone patterns and/or overlay codes can be achieved through the use of machine learning models. For instance, a given condition under which a reference signal is to be communicated from a UE to a base station (and/or from a base station to a user equipment) can be provided as input to a trained machine learning model. Over time, the machine learning model can be trained to associate various conditions with different Resource Elements (REs) best suited for tone placement under different conditions and/or associated overlay codes in order to achieve an optimized output (e.g., improved spectral efficiency). Once trained, when such conditions can be provided as input, the machine learning model can process the input and can provide an optimized tone pattern and/or overlay code used for transmission of the underlying reference signal. In some examples, the tone patterns and/or overlay codes can be dynamically determined using other techniques.

Additional aspects of the present disclosure are described in more detail below.

According to various aspects, FIG. 1 illustrates an example of a wireless communications system 100. The wireless communications system 100 (which may also be referred to as a wireless wide area network (WWAN)) can include various base stations 102 and various UEs 104.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A base station may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). As used herein the term traffic channel (TCH) can refer to either an uplink, reverse or downlink, and/or a forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Referring back to FIG. 1, the base stations 102 can include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case).

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2A:
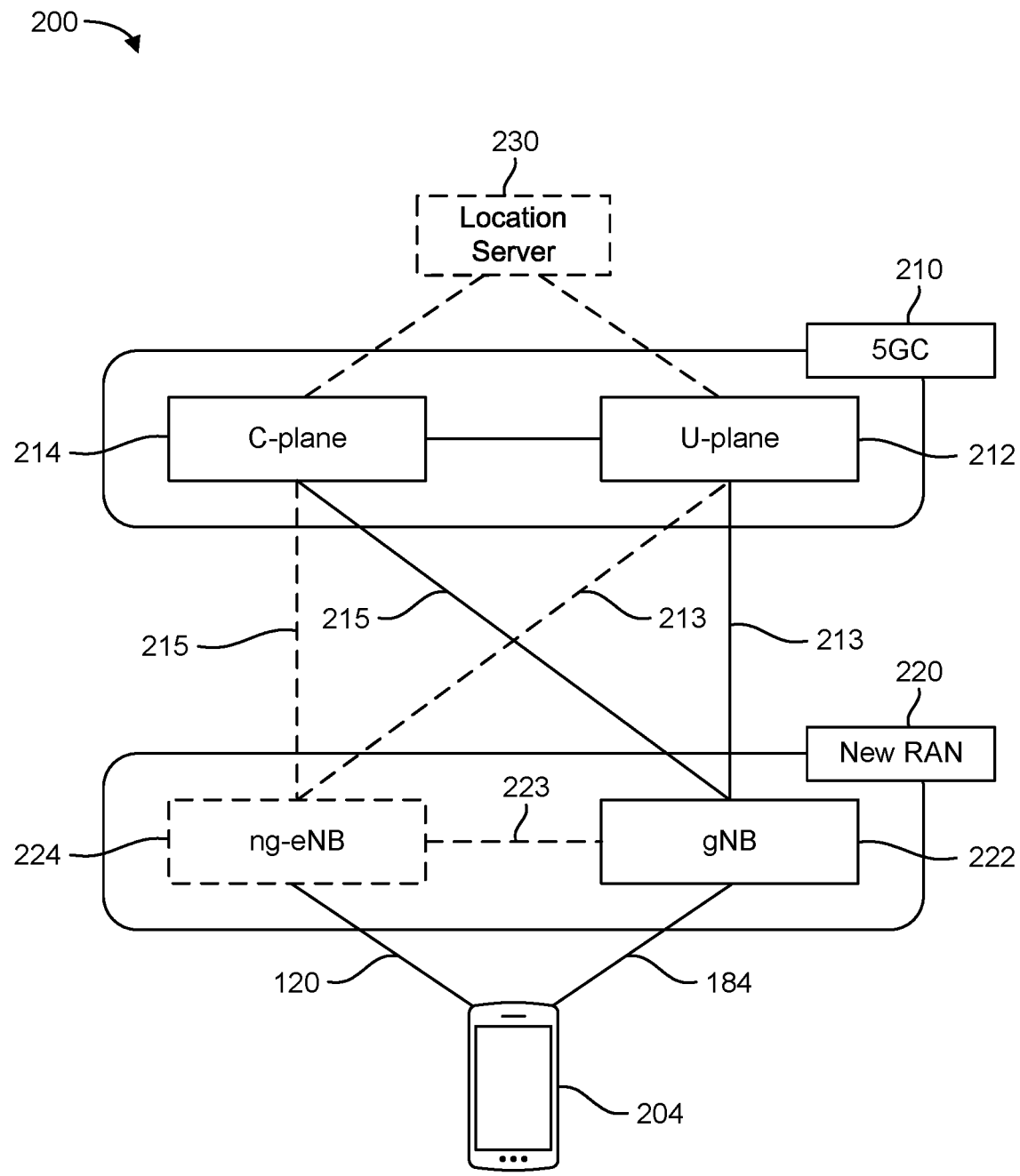
FIGS. 2A and 2B are diagrams illustrating example wireless network structures, in accordance with some aspects of the present disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated with a component of the core network, or alternatively may be external to the core network. In some examples, the location server 230 can be operated by a carrier or provider of the 5GC 210, a third party, an original equipment manufacturer (OEM), or other party. In some cases, multiple location servers can be provided, such as a location server for the carrier, a location server for an OEM of a particular device, and/or other location servers. In such cases, location assistance data can be received from the location server of the carrier and other assistance data can be received from the location server of the OEM.

Figure 2B:
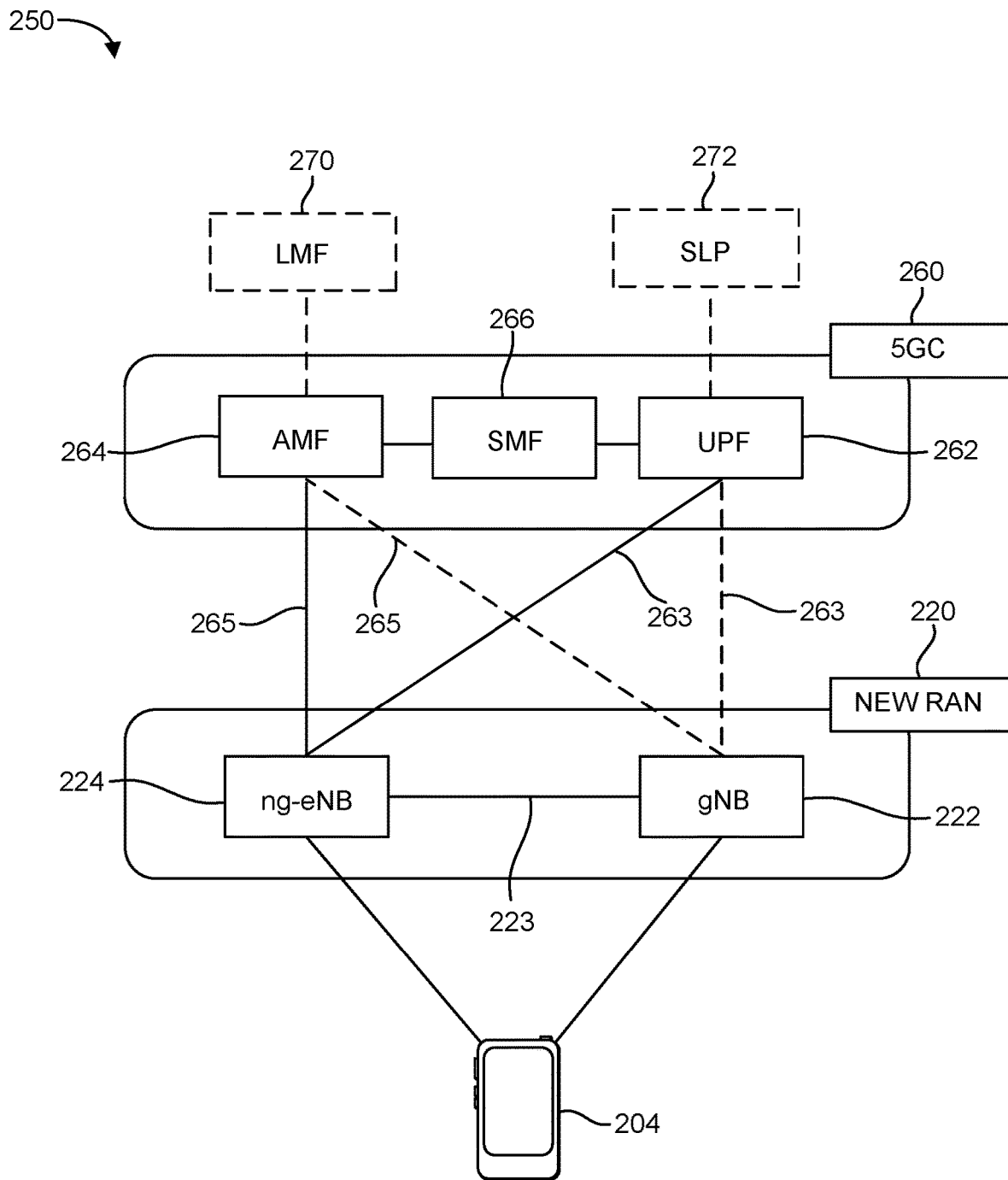

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated with a base station, such as the gNB 222 and/or the ng-eNB 224. When integrated with the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3:
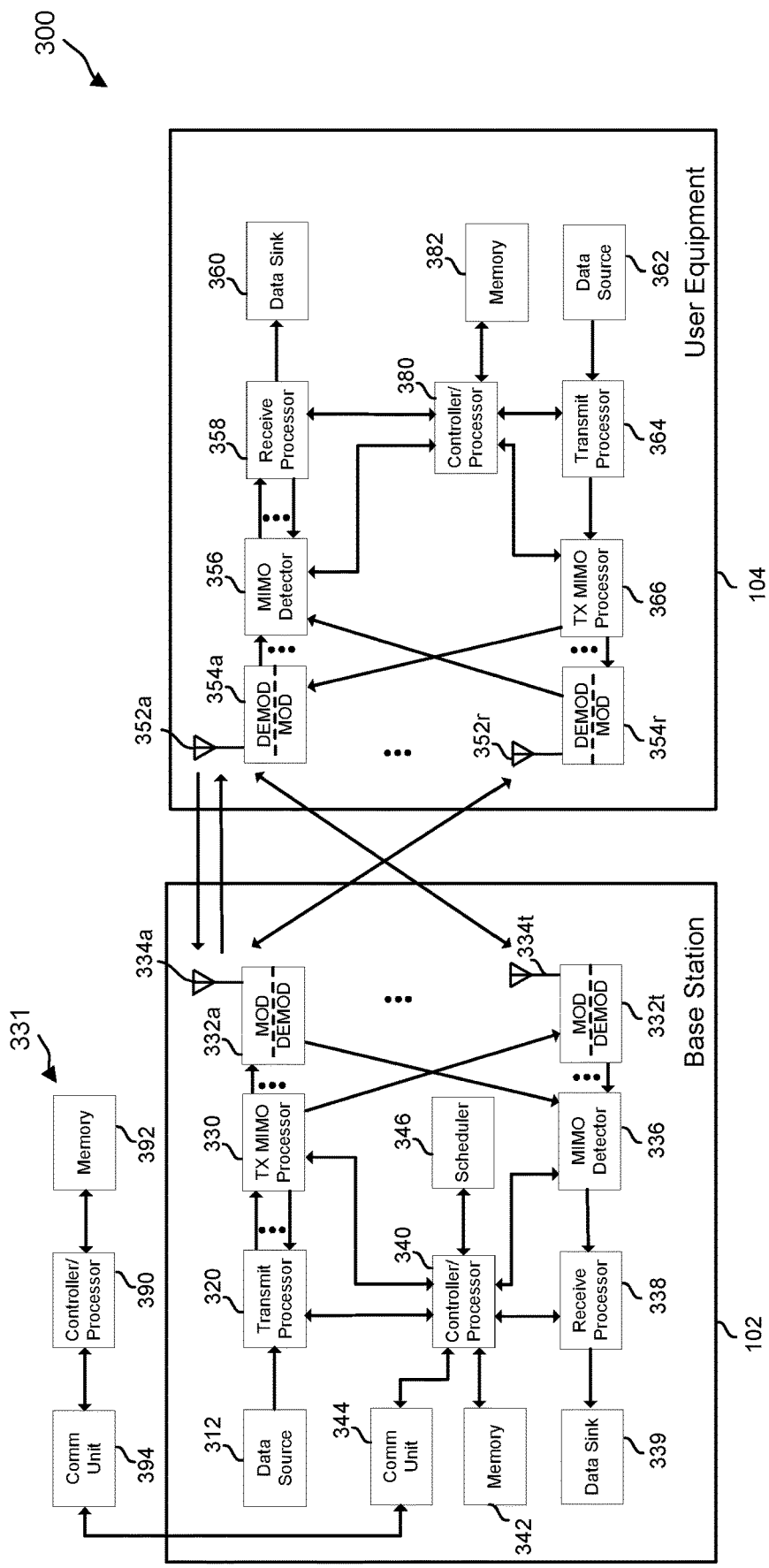
FIG. 3 is a diagram illustrating a design of a base station and a User Equipment (UE) device that enable transmission and processing of signals exchanged between the UE and the base station, in accordance with some aspects of the present disclosure.

FIG. 3 shows a block diagram of a design of a base station 102 and a UE 104 that enable transmission and processing of signals exchanged between the UE and the base station, in accordance with some aspects of the present disclosure. Design 300 includes components of a base station 102 and a UE 104, which may be one of the base stations 102 and one of the UEs 104 in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. The modulators 332a through 332t are shown as a combined modulator-demodulator (MOD-DEMOD). In some cases, the modulators and demodulators can be separate components. Each modulator of the modulators 332a to 332t may process a respective output symbol stream, e.g., for an orthogonal frequency-division multiplexing (OFDM) scheme and/or the like, to obtain an output sample stream. Each modulator of the modulators 332a to 332t may further process (e.g., convert to analog, amplify, filter, and upconvert) the output sample stream to obtain a downlink signal. T downlink signals may be transmitted from modulators 332a to 332t via T antennas 334a through 334t, respectively. According to certain aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. The demodulators 354a through 354r are shown as a combined modulator-demodulator (MOD-DEMOD). In some cases, the modulators and demodulators can be separate components. Each demodulator of the demodulators 354a through 354r may condition (e.g., filter, amplify, downconvert, and digitize) a received signal to obtain input samples. Each demodulator of the demodulators 354a through 354r may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals (e.g., based at least in part on a beta value or a set of beta values associated with the one or more reference signals). The symbols from transmit processor 364 may be precoded by a TX-MIMO processor 366 if application, further processed by modulators 354a through 354r (e.g., for DFT-s-OFDM, CP-OFDM, and/or the like), and transmitted to base station 102. At base station 102, the uplink signals from UE 104 and other UEs may be received by antennas 334a through 334t, processed by demodulators 332a through 332t, detected by a MIMO detector 336 if applicable, and further processed by a receive processor 338 to obtain decoded data and control information sent by UE 104. Receive processor 338 may provide the decoded data to a data sink 339 and the decoded control information to controller (processor) 340. Base station 102 may include communication unit 344 and communicate to a network controller 331 via communication unit 344. Network controller 331 may include communication unit 394, controller/processor 390, and memory 392.

In some aspects, one or more components of UE 104 may be included in a housing. Controller 340 of base station 102, controller/processor 380 of UE 104, and/or any other component(s) of FIG. 3 may perform one or more techniques associated with implicit UCI beta value determination for NR.

Memories 342 and 382 may store data and program codes for the base station 102 and the UE 104, respectively. A scheduler 346 may schedule UEs for data transmission on the downlink and/or uplink.

In some implementations, UE 104 may include means for determining a tone pattern for a reference signal for use in communications between the UE 104 and the base station 102, the tone pattern including an irregular combination of resource elements in one or more resource blocks for the reference signal, wherein the resource elements are shared by a plurality of antennas for transmission of reference signals between UEs and the base station 102; determining an overlay code for the tone pattern; and transmitting the reference signal using the tone pattern and the overlay code.

In some implementations, base station 102 may include means for determining a tone pattern for a reference signal for use in communications between the base station 102 and the UE 104, the tone pattern including an irregular combination of resource elements in one or more resource blocks for the reference signal, wherein the resource elements are shared by a plurality of antennas for transmission of reference signals between UEs and the base station 102; determining an overlay code for the tone pattern; and transmitting the reference signal using the tone pattern and the overlay code.

As noted above, tone patterns can be defined as specific arrangement of resource elements in a given resource block for transmission of a reference signal between a UE such as one of UEs 104 and a base station such as base station 102. Tone patterns are currently pre-defined in the 5G communication standards, and can be referred to herein as pre-defined regular tone patterns. Such pre-defined tone patterns may not be optimized for all environments. For instance, the arrangement or combination of resource elements used for transmission of a particular reference signal may not be optimized across all possible conditions under which a user equipment and a base station operate. Therefore, signal efficiency and latency reduction for 5G mobile systems can be improved through a dynamic determination of optimal tone pattern configurations.

Figure 4A:
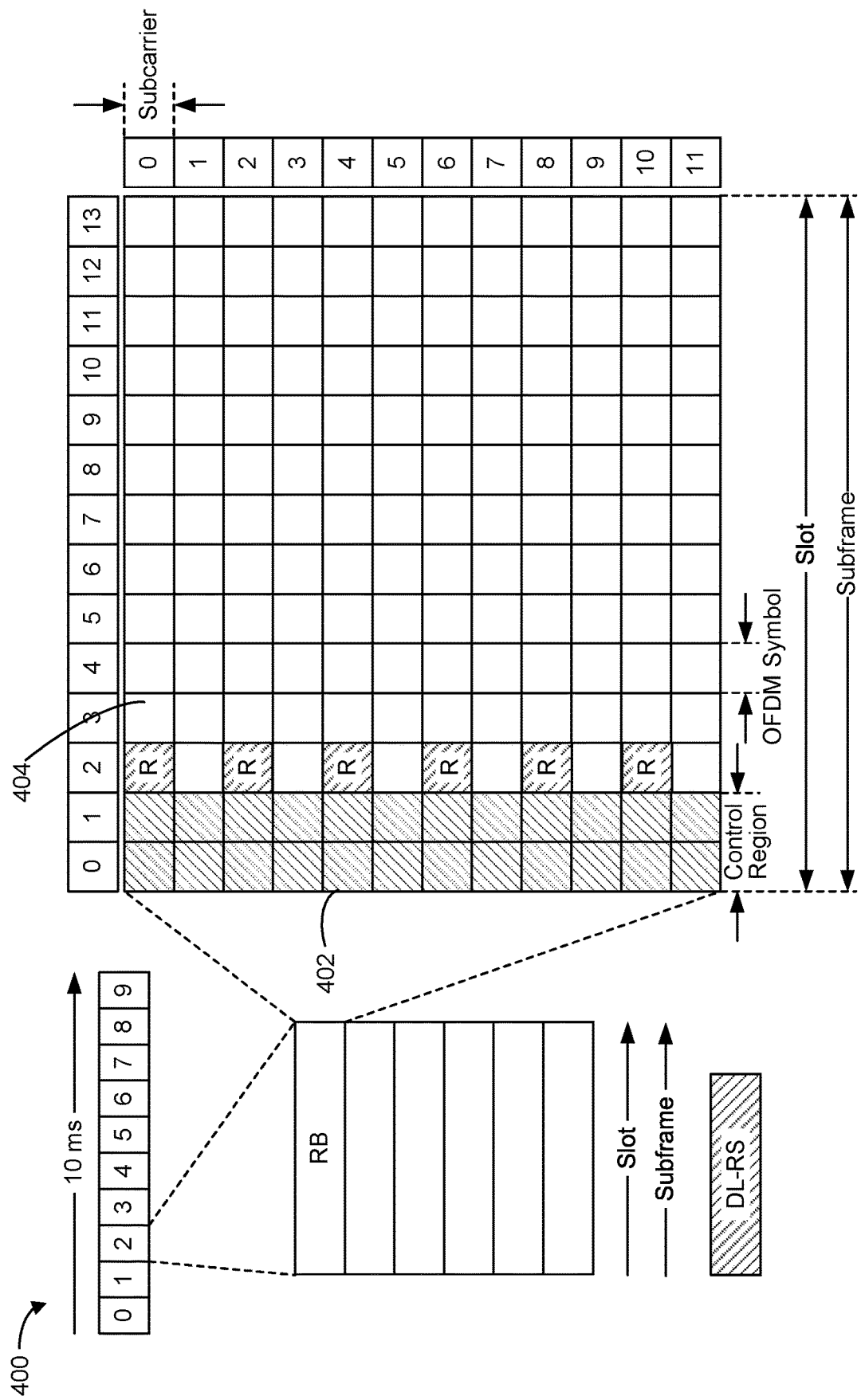
FIGS. 4A-C are conceptual diagram illustrating examples of frame structures, in accordance with some aspects of the present disclosure.
Figure 4B:
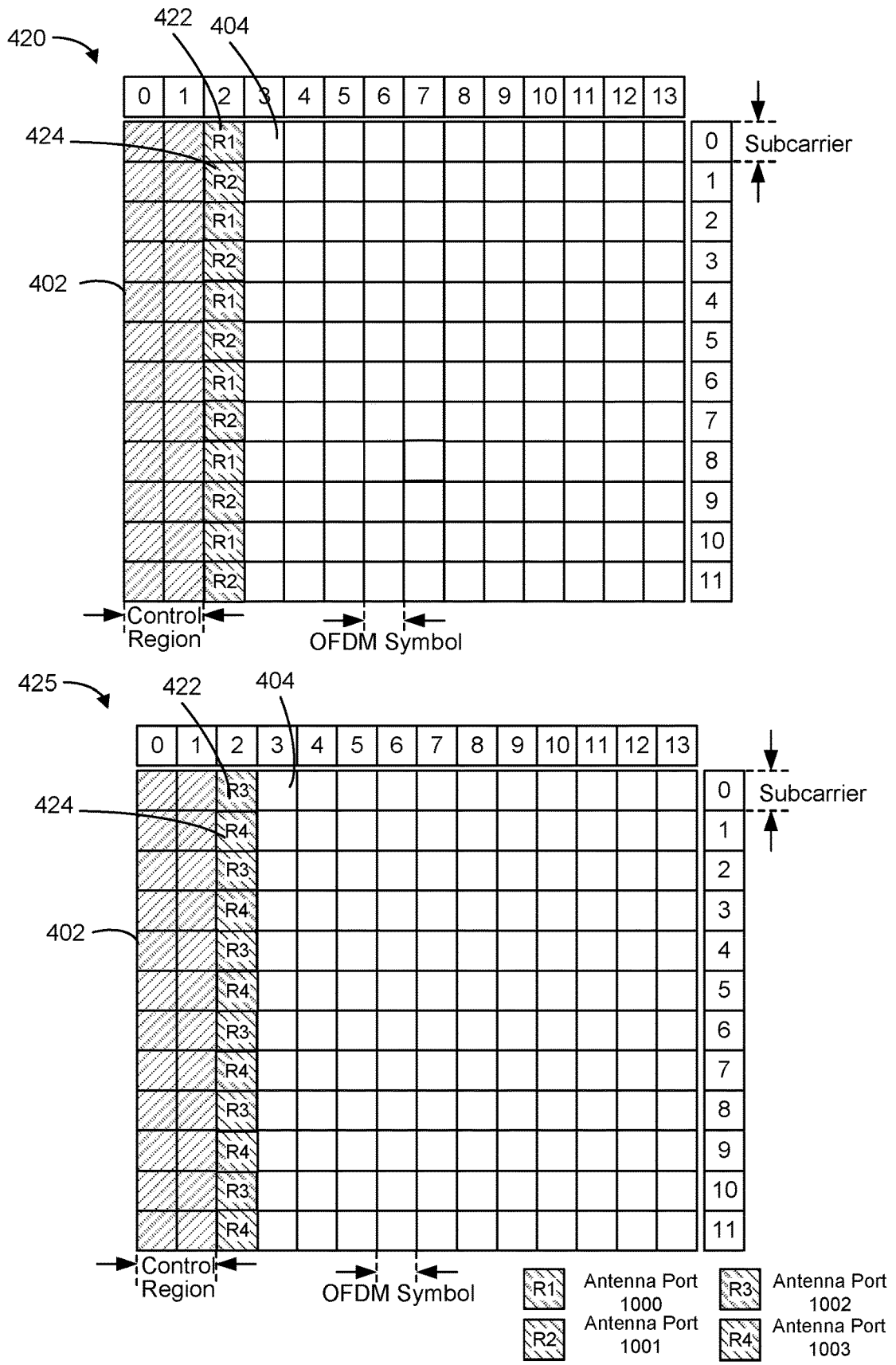
Figure 4C:
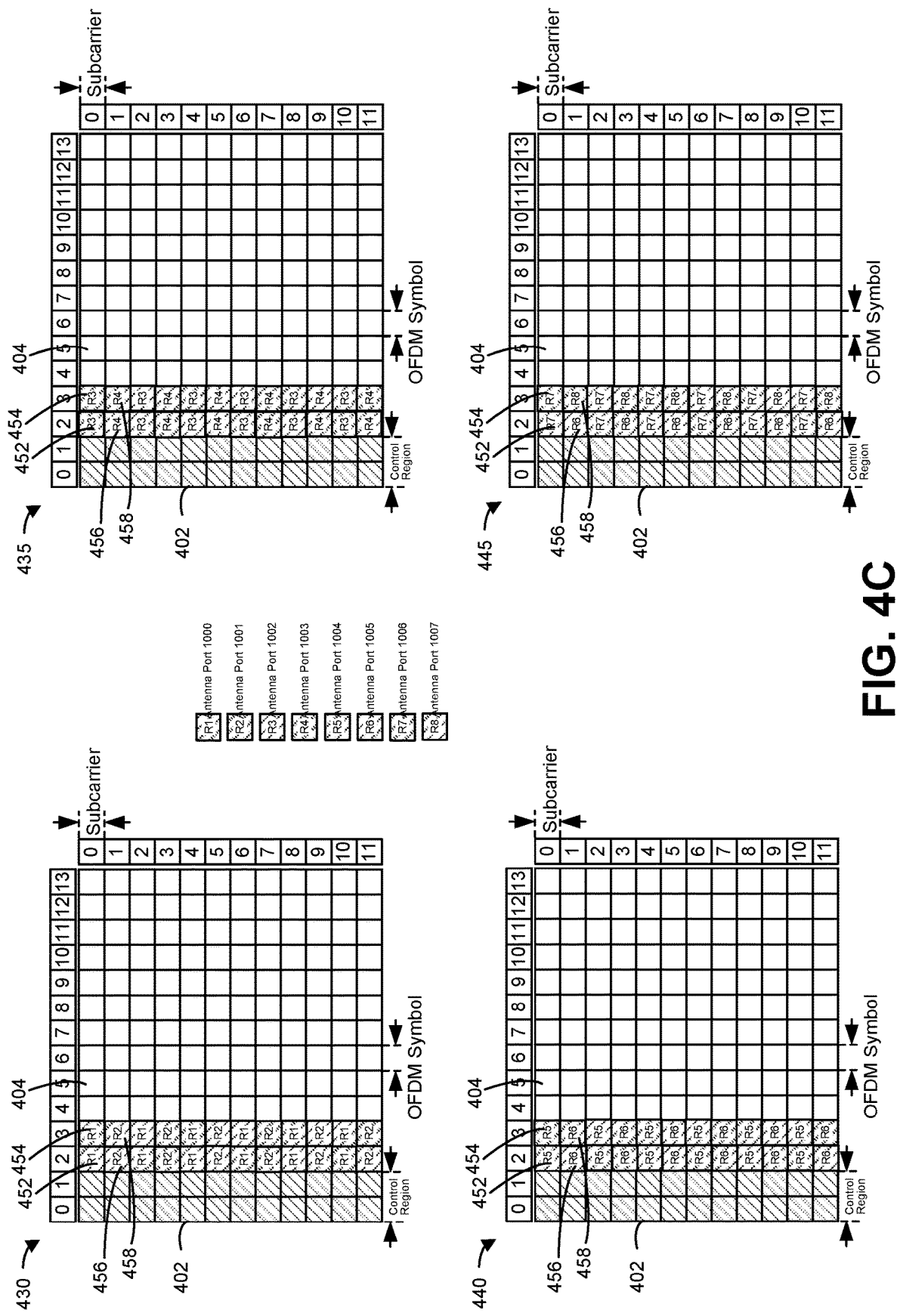

A resource block may be transmitted on UL or DL between the UE 104 and the base station 102 using a radio frame. Various radio frame structures may be used to support downlink and uplink transmissions between network nodes (e.g., base stations and UEs). FIGS. 4A-C are diagrams illustrating examples of frame structures, according to some aspects of the disclosure. Other wireless communications technologies may have different frame structures and/or different channels.

NR (and LTE) utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$). For example, subcarrier spacing (SCS) of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In one example, a numerology of 15 kHz is used. Thus, in the time domain, a 10 millisecond (ms) frame is divided into 10 equally sized subframes of 1 ms each, and each subframe includes one time slot. In FIG. 4A, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. FIG. 4 illustrates an example of a resource block (RB) 402. The resource grid is further divided into multiple resource elements (REs). Referring to FIG. 4, the RB 402 includes multiple REs, including resource element (RE) 404. The RE 404 may correspond to one symbol length in the time domain and one subcarrier in the frequency domain. In the numerology of FIG. 4, for a normal cyclic prefix, RB 402 may contain 12 consecutive subcarriers in the frequency domain and seven consecutive symbols in the time domain, for a total of 84 REs such as RE 404. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RSs) when communicating on a DL channel. Similarly, when communicating on an UL channel, some of the REs can carry uplink reference (pilot) signals (UL-RS). A DL-RS may include, but is not limited to, PRS, PTRS, CRS, CSI-RS, DMRS, PSS, SSS, SSB, etc. An UL-RS can include, but is not limited to, DMRS, SRS, etc. FIG. 4A illustrates example locations of REs carrying a DL-RS (e.g., a DMRS with each RE being labeled with an "R"). FIG. 4A and subsequent examples below will be described in relation to a DMRS as an illustrative example of a DL-RS and/or UL-RS. However, the present disclosure is not limited thereto and the dynamic based techniques described herein for determining tone patterns can be equally applied to any other DL-RS and/or UL-RS.

A collection of resource elements (REs) that are used for transmission of reference signals is referred to as a tone pattern. The tone pattern can span multiple REs over a single RB, multiple REs over multiple RBs in the frequency domain and 'N' (e.g., 1 or more) consecutive symbol(s) within a slot in the time domain, or can span a single RE in a given RB. An RE may have a real or complex value.

Typically, in a RB such as the RB 402, a number of initial REs are reserved for transmission of control signals (e.g., first two OFDM symbols with shaded REs in the Control Region shown in FIG. 4A). Furthermore, REs of the RB 402 that are labeled with an "R" in FIG. 4A represent an example tone pattern for an example reference signal (e.g., a DMRS) signal in RB 402. A tone pattern may be defined using (time (subcarrier), frequency (OFDM symbol)) coordinates. As an example, configuration 400 of FIG. 4A illustrates an example DMRS tone pattern with REs having coordinates (2,0), (2, 2), (2, 4), (2,6), (2,8) and (2,10). In example configuration 400 of FIG. 4A, one OFDM symbol is dedicated for transmission of a DMRS. As shown, every second RE (e.g., at OFDM symbol 2 and subcarriers (time slots) 0, 2, 4, 6, 8 and 10) is dedicated to an example DMRS in the RB 402. The example DMRS tone pattern of FIG. 4A, is said to be front-loaded in RB 402. Various other tone patterns may be used for different reference signals of the 5G standard as defined by the 3GPP. The example tone pattern shown in FIG. 4A, as well as other tone patterns specified by the 3GPP as part of the 5G standard, are pre-defined. For instance, when a reference signal (e.g., a DMRS) is to be sent on a DL channel and/or an UL channel between the base station 102 and the UE 104 (which can be in every RB, every second RB, etc.), one such pre-defined tone pattern can be used.

FIG. 4B illustrates another configuration of a DMRS pattern for a MIMO system using four antenna ports (e.g., each of the base station 102 and/or the UE 104 can have a four port antenna), where Frequency Division Multiplexing (FDM) is used to enable utilization of each resource element by two of the antenna ports. In this instance, an OCC (overlay code) may be utilized by a device receiving the DMRS (e.g., one of the base station 102 and/or the UE 104) to determine which of the tones received on a given RE correspond the DMRS intended for reception and use by the device. In the example of FIG. 4B, one OFDM symbol (e.g., OFDM symbol 2) is used for transmission of a front-loaded DMRS signal by each of the four antennas of a device sending the DMRS (e.g., the base station 102 or the UE 104). Given that each RE is shared by two of the four antennas in the example of FIG. 4B, two separate illustrations including the illustration 420 and the illustration 425 of the RB 402 are provided to visually assist with the understanding of shared REs by different antennas. For example, the RE 422 is designated with "R1" in illustration 420 to indicate that the RE 422 is used as part of the DMRS tone pattern to be transmitted via antenna 1000. The same RE 422 is designated with "R3" in the illustration 425 to indicate that the RE 422 is also used as part of the DMRS tone pattern to be transmitted via antenna 1002.

As shown in FIG. 4B, every second RE starting at the RE 422 (e.g., the REs having coordinates (0,2), (2,2), (4,2), (6,2), (8,2) and (10,2)) is designated with an "R1" in the illustration 420 and designated with an "R3" in the illustration 425 to indicate use by antenna 1000 and 1002, respectively for transmitting a DMRS. Similarly every RE starting at the RE 424 (e.g., the REs having coordinates (1,2), (3,2), (5,2), (7,2), (9,2) and (11,2)) is designated with an "R2" in the illustration 420 and designated with an "R4"

in the illustration 425 to indicate use by antenna ports 1001 and 1003, respectively for transmitting a DMRS. As described above, OCCs may be used by the device receiving the DMRS to decode (demodulate) the intended tone from among the two tones transmitted on the same RE. For example, a one-dimensional OCC may be used in association with decoding a DMRS of FIG. 4B and can have any number of known or to-be-developed formats including, but not limited to, a Walsh code sequence, a Fourier Transform sequence, a Discrete Fourier Transform sequence, and/or any other type of known or to-be-developed orthogonal code.

FIG. 4C illustrates another configuration of a DMRS pattern for a MIMO system using eight antenna ports 1000, 1001, 1002, 1003, 1004, 1005, 1006 and 1007 (e.g., each of the base station 102 and/or the UE 104 can have a four port antenna), where FDM is used to enable utilization of each resource element by four of the antenna ports. Similarly in this instance, a length-4 OCC (overlay code) may be utilized by a device receiving the DMRS (e.g., one of the base station 102 and/or the UE 104) to determine which of the tones received on a given RE correspond the DMRS intended for reception and use by the device. As an example, a length-4 OCC can be formed as a length-4 Walsh code (e.g., 2-by-2 sequence) indicated by a sequence {a, b, c, d}, in which a, b, c and d can take on a value of "+1" or "−1" with a zero cross-correlation. In one illustrative example using a 2-by-2 sequence, a length-4 OCC code can be {1, 1, 1, 1} corresponding to a first antenna port, {1, −1, 1, −1} corresponding to a second antenna port, {1, 1, −1, −1} corresponding to a third antenna port, and {1, −1, 1, −1} corresponding to a fourth antenna port, and so on. In example of FIG. 4C, two OFDM symbols (e.g., OFDM symbols 2 and 3) are used for transmission of a front-loaded DMRS signal by each of the eight antennas of a device sending the DMRS (e.g., one of the base station 102 and/or the UE 104). In this instance and due to the use of two OFDM symbols, a pair of REs (e.g., the pair of RE 452 and RE 454 or the pair of RE 456 and the RE 458) are shared by four antennas for transmission of DMRSs.

FIG. 4C provides four separate illustrations including the illustration 430, the illustration 435, the illustration 440 and the illustration 425 of the RB 402 to visually assist with the understanding shared pairs of REs by different antennas. For example, the pair of REs 452 and 454 is designated with "R1" in the illustration 430 to indicate that the pair of REs 452 and 454 is used as part of the DMRS tone pattern to be transmitted via antenna 1000. The same pair of REs 452 and 454 is designated with "R3" in the illustration 435 to indicate that the pair of REs 452 and 454 is used as part of the DMRS tone pattern to be transmitted via antenna 1002. The same pair of REs 452 and 454 is designated with "R5" in the illustration 440 to indicate that the pair of REs 452 and 454 is used as part of the DMRS tone pattern to be transmitted via antenna 1004. The same pair of REs 452 and 454 is designated with "R7" in the illustration 445 to indicate that the pair of REs 452 and 454 is used as part of the DMRS tone pattern to be transmitted via antenna 1006.

As shown in FIG. 4C, every second pair of REs starting at the pair of REs 452 and 454 (e.g., the RE having the coordinates (0,2), (0,3), (2,2), (2,3), (4,2), (4,3), (6,2), (6,3), (8,2), (8,3), (10,2) and (10,3)) is designated with an "R1" in the illustration 430, "R3" in the illustration 435, "R5" in the illustration 440 and "R7" in the illustration 445 to indicate use by antenna ports 1000, 1002, 1004, and 1006, respectively for transmitting a DMRS. Similarly every RE starting at the pair of REs 456 and 458 (e.g., the REs having coordinates (1,2), (1,3), (3,2), (3,3), (5,2), (5,3), (7,2), (7,3), (9,2), (9,3), (11,2) and (11,3)) is designated with an "R2" in the illustration 430, "R4" in the illustration 435, "R6" in the illustration 440 and "R8" in the illustration 445 to indicate use by antenna ports 1001, 1003, 1005, and 1007, respectively for transmitting a DMRS. As described above, OCCs may be used by the device receiving the DMRS to decode (demodulate) the intended tone from among the two tones transmitted on the same RE. For example, a two-dimensional OCC may be used in association with decoding a DMRS of FIG. 4C and can have any number of known or to-be-developed formats including, but not limited to, a Walsh code sequence, a Fourier Transform sequence, a Discrete Fourier Transform sequence, and/or any other type of known or to-be-developed orthogonal code. As an example, a length-4 OCC can be formed as a length-4 Walsh code (e.g., 2-by-2 sequence) indicated by a sequence {a, b, c, d}, in which a, b, c and d can take on a value of "+1" or "−1" with a zero cross-correlation.

Example tone patterns described with reference to FIGS. 4B and 4C can be referred to as multiplexed tone patterns for MIMO systems. It should be understood that while a four antenna ports example and an eight antenna ports example are described with reference to FIGS. 4B and 4C, respectively, the present disclosure is not limited to these examples and multiplexed tone patterns can be generated for devices with more or less antennas (e.g., devices having up to 64 antennas or more).

Relying on pre-defined (and/or front-loaded) tone patterns (e.g., as in the example tone patterns described with reference to FIGS. 4A-C) decoupled from conditions under which a UE and a base station communicate (channel conditions), may result in redundant and/or otherwise inefficient use of network resources for transmitting reference signals. One example of such inefficient use of network resources includes the overhead associated with transmission of reference signals, which can be reduced by implementing techniques described below for determining tone patterns and/or associated overlay codes for transmission of reference signals.

As noted above, systems and techniques are described herein for determining optimized multiplexed tone patterns and/or associated OCCs (can also be referred to as optimized and/or customized tone patterns and/or OCCs) used for multi-antenna transmission of references signals between UEs and base stations. In some cases, the systems and techniques can be implemented by a base station such as the base station 102. In some examples, the systems and techniques can be implemented by a UE such as the UE 104. The systems and techniques can determine a multiplexed tone pattern based on current and/or prior conditions of a communication channel between a UE and a base station. Upon determination of a multiplexed tone pattern for transmission of a reference signal between a UE and a base station, the systems and techniques described herein can also determine a corresponding OCC for the multiplexed tone pattern.

Configuring the UE and/or the base station to determine an optimized (and/or customized) tone pattern for a reference signal (e.g., each time a reference signal is to be sent on the DL channel to the UE or each time the reference signal is to be sent on the UL from the UE to the base station) using OFDM in MIMO systems and corresponding OCC codes can improve the efficiency of network resource utilization at the physical layer, can reduce overhead associated with transmission of reference signals (e.g., based on EPRE=0 for some RS tones, as described herein), etc.

For example, under certain conditions, such as UE mobility conditions, environmental conditions, and/or transmission and reception capabilities of UEs and base stations (e.g., a UE having an advanced receiver that can estimate channels using lower RS tones, etc.), use of the example tone pattern in FIGS. 4A-C may be redundant or inefficient. In such cases and in other cases, For instance, a front loaded and/or possibly regular (e.g., pre-defined) tone pattern multiplexed for DL transmission to multiple different UEs and/or multiple antennas of a UE, as described with reference to FIGS. 4A-C, may not be optimal. Using the systems and techniques described herein, under such conditions or others, the UE and/or base station can customize the tone pattern and/or associated overlay code for transmission of reference signals. In one illustrative example, the UE 104 may be stationary and within a threshold distance of the base station 102 to which it is connected. In such an example, front-loading the RB 402 with 2 OFDM symbols in the eight antenna ports example of FIG. 4C may result in an inefficient use of spectral resources.

In some examples, the tone pattern and/or OCC optimization systems and techniques described herein can take into account channel conditions or other factors when determining optimized tone patterns and/or associated OCC. For instance, base stations and the UEs (e.g., the base station 102 and the UE 104 described above with reference to FIG. 1), exchange various reference signals. Reference signals may be used by a base station or a UE to make one or more measurements including, but not limited to, channel throughput, channel distortion, Reference Signal Receive Power (RSRP) during mobility and beam management, frequency/time tracking, demodulation and UL reciprocity based pre-coding, path delay spread and Doppler spread, etc. On an UL channel, an UL-DMRS can be used for channel estimation and/or coherent demodulation associated with Physical Uplink Shared Channel (PUSCH), a Physical Uplink Control Channel (PUCCH), etc. if the base station does not properly process an UL-DMRS (e.g., decode the OCC of the UL-DMRS), the base station may not be able to process information transmitted on the PUSCH, PUCCH and/or any other transmitted UL information. Similarly, on a DL channel, a DL-DMRS can be used for channel estimation (e.g., on a Physical Downlink Shared Channel (PDSCH), Physical Downlink Control Channel (PDCCH), and/or other downlink channel), If the UE does not process a. DL-DMRS (e.g., decode the OCC of the DL-DMRS), the UE may not be able to process information transmitted on the PDSCH, PDCCH and/or other transmitted DL information. Proper generation and transmission of OCC ensures a proper decoding of UL-DMRS and/or DL-DMRS. Such measurements may vary depending on channel conditions (e.g., environment conditions, mobility status, etc.) and the specific tone pattern over which reference signals are exchanged between a UE and a base station. By observing changes to measurements over time, UEs and base stations can learn the tone patterns that result in improved measurements for given underlying channel conditions.

In some cases, tone patterns may be multiplexed using FDM for transmission and reception in a MIMO system. As further described below, for any tone pattern determined according to the systems and techniques of the present disclosure, an OCC can also be constructed for multiplexing the tone pattern to enable the UE and/or the base station receiving the multiplexed tone pattern to decode and demodulate the tone pattern, retrieve the reference signal and make corresponding measurements.

In some examples, as described in more detail below, a machine learning model may be trained using a training dataset to determine best tone patterns for reference signal transmission given a set of channel conditions. In some aspects, the training dataset can include channel conditions, different tone patterns over which UEs receive reference signals (e.g., DMRS signals), resulting measurements made by the receiving UEs and/or base stations under such channel conditions and tone patterns, measured throughput, etc. Once trained, the machine learning model can receive as input channel conditions (e.g., one or more parameters associated with a communication channel between the UE 104 and the base station 102 to which it is connected such as mobility status of the UE 104, environmental conditions in which the UE 104 is operating, etc.) and provide as output a recommended tone pattern for the base station 102 to use for sending CSI-RS and/or TRS on the DL channel to the UE 104.

The machine learning model can be further trained using OCC patterns previously utilized in association with multiplexed tone patterns such that the machine learning model can provide as output a particular recommended tone pattern (can be a new pattern or a previously known/utilized tone pattern) for a given channel condition and/or a recommended OCC pattern to be used for transmission of the multiplexed tone pattern.

Examples of a tone pattern optimization process will now be described with reference to FIGS. 5-9. FIGS. 5-9 are described below in association with transmission of multiplexed UL-DMRSs and/or DL-DMRSs in a MIMO system. Furthermore, example embodiments are described with reference to a Single-User (SU) Multiple-Input Multiple-Output (MIMO) (SU-MIMO), such as when the UE 104 includes and/or uses multiple antennas to communicate with multiple antennas at the base station 102. However, the present disclosure is not limited to UL-DMRS, DL-DMRS and/or SU-MIMO systems, and can be equally applicable to any other type of reference signal transmission on the UL and/or the DL in any other type of system (e.g., MU-MIMO system).

Figure 5:
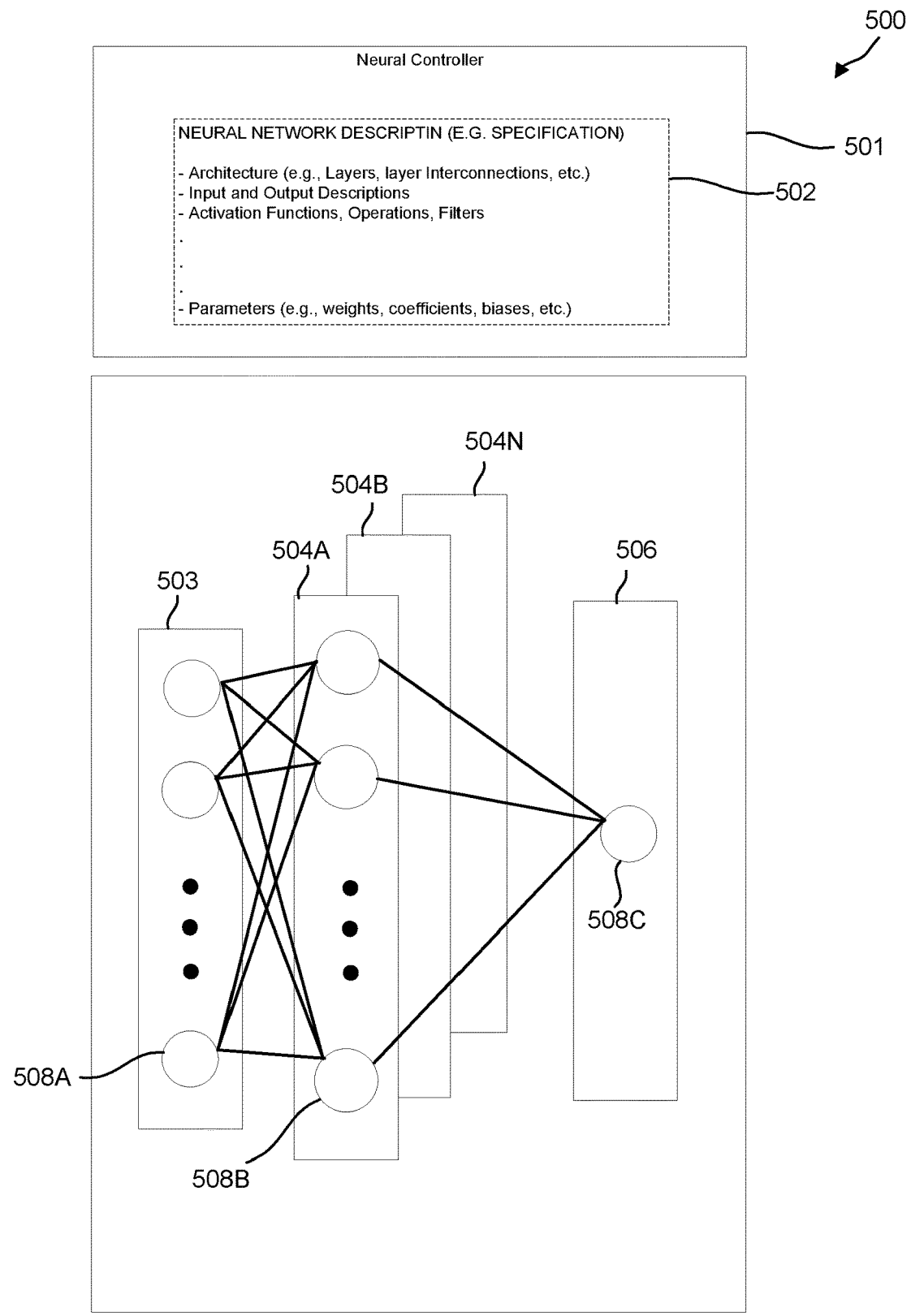
FIG. 5 is a conceptual diagram illustrating an example of a machine learning model that can be configured to facilitate tone pattern and associated overlay code determination, in accordance with some aspects of the present disclosure.

FIG. 5 illustrates an example neural architecture of a neural network 500 that can be trained for tone placement and/or associated overlay code determination, in accordance with some aspects of the present disclosure. Example neural architecture of a neural network 500 may be defined by an example neural network description 502 in neural controller 501. The neural network 500 is an example of a machine learning model that can be deployed and implemented at the base station 102 and/or the UE 104. The neural network 500 can be a feedforward neural network or any other known or to-be-developed neural network or machine learning model.

The neural network description 502 can include a full specification of the neural network 500, including the neural architecture shown in FIG. 5. For example, the neural network description 502 can include a description or specification of architecture of the neural network 500 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 500 can reflect the neural architecture defined in the neural network description 502. In this non-limiting example, the neural network 500 includes an input layer 503, which after being trained, can receive one or more sets of input data. The input data can be any type of data such as one or more parameters associated with a communication channel (e.g., environmental conditions associated with UL and DL communication channels between the UE 104 and the base station 102, UE mobility status, etc.), various measurements made by the base station 102 and the UE 104 using previously transmitted reference signals, corresponding OCC patterns used in association with previously transmitted reference signals in MIMO systems, etc.

The neural network 500 can include the hidden layers 504A through 504N (collectively "504" hereinafter). A hidden layers 504 can include n number of hidden layers, where n is an integer greater than or equal to one. The number of hidden layers can include as many layers as needed for a desired processing outcome and/or rendering intent. In one illustrative example, any one of the hidden layer 504 can include data representing one or more of the data provided at the input layer 503 such as one or more parameters associated with a communication channel (e.g., environmental conditions associated with UL and DL communication channels between the UE 104 and the base station 102, UE mobility status, etc.), previously utilized tone patterns for communication of reference signals and associated OCC pattern(s), one or more measurements and associated throughputs made by the base station 102 and/or the UE 104 using the previously utilized tone patterns, a delta (difference) between the measurements made by the base station 102 and/or the UE 104 using the different tone patterns, etc.

The neural network 500 further includes an output layer 506 that provides an output resulting from the processing performed by hidden layers 504. In one illustrative example, the output layer 506 can provide output data based on the input data. In one example context related to determination of a tone pattern for transmission of a DMRS, the output data can include a recommended tone pattern to be used by the base station 102 and/or the UE 104 for sending a DL-DMRS or an UL-DMRS, respectively.

The neural network 500, in this example, is a multi-layer neural network of interconnected nodes. Each node can represent a piece of information. Information associated with the nodes is shared among the different layers and each layer retains information as information is processed. In some cases, the neural network 500 can include a feed-forward neural network. In other cases, the neural network 500 can include a recurrent neural network, which can have loops that allow information to be carried across nodes while reading in input.

Information can be exchanged between nodes through node-to-node interconnections between the various layers. The nodes of the input layer 503 can activate a set of nodes in the first hidden layer 504A. For example, as shown, each input node of the input layer 503 is connected to each node of the first hidden layer 504A. The nodes of the hidden layer 504A can transform the information of each input node by applying activation functions to the information. The information derived from the transformation can then be passed to and can activate the nodes of the next hidden layer (e.g., 504B), which can perform their own designated functions. Example functions include convolutional, up-sampling, data transformation, pooling, and/or any other suitable functions. The output of hidden layer (e.g., 504B) can then activate nodes of the next hidden layer (e.g., 504N), and so on. The output of last hidden layer can activate one or more nodes of the output layer 506, at which point an output is provided. In some cases, while nodes (e.g., nodes 508A, 508B, 508C) in the neural network 500 are shown as having multiple output lines, a node has a single output and all lines shown as being output from a node represent the same output value.

In some cases, each node or interconnection between nodes can have a weight that is a set of parameters derived from training the neural network 500. For example, an interconnection between nodes can represent a piece of information learned about the interconnected nodes. The interconnection can have a numeric weight that can be tuned (e.g., based on a training dataset), allowing the neural network 500 to be adaptive to inputs and able to learn as more data is processed.

The neural network 500 can be pre-trained to process the features from the data in the input layer 503 using different hidden layers 504 in order to provide the output through the output layer 506. In some cases, the neural network 500 can adjust weights of nodes using a training process called backpropagation. Backpropagation can include a forward pass, a loss function, a backward pass, and a weight update. The forward pass, loss function, backward pass, and parameter update can be performed for one training iteration. The process can be repeated for a certain number of iterations for each set of training data until the weights of the layers are accurately tuned (e.g., meet a configurable threshold determined based on experiments and/or empirical studies).

The neural network 500 can include any suitable neural or deep learning type of network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 500 can represent any other neural or deep learning network, such as an autoencoder, a deep belief nets (DBNs), a recurrent neural network (RNN), etc.

Once trained, the neural network 500 can receive as input one or more parameters associated with a communication channel between the base station 102 and the UE 104. Such parameters can include, but are not limited to, environmental conditions in which the base station 102 and the UE 104 are communicating (e.g., weather conditions, indoor/outdoor channel conditions, and/or cellular or wireless connectivity, transmission capabilities and power of the base station 102 and/or the UE 104, etc.). In some aspects, environmental conditions may further include a mobility status of the UE 104 (e.g., how fast the UE 104 is moving toward or away from the base station 102, etc.), multipath characteristics of the channel, and/or various measurements made by the base station 102 and the UE 104 using previously transmitted reference signals, e.g., tone patterns used in previous RBs for transmission of the reference signals, etc. The neural network 500 can then provide as output, a recommendation for a tone pattern to be used for transmission of an underlying reference signal. For a MIMO system, the neural network 500 can also provide as output a recommended OCC to be used for transmission and/or decoding of multiplexed reference signals (e.g., a multiplexed DMRS signal described above with reference to FIGS. 4B and 4C). As described in more detail below, the trained neural network 500 can be deployed at the UE 104 or alternatively at the base station 102.

In some examples, a receiver (e.g., the base station 102 and/or the UE 104) can monitor, in real-time (e.g., as REs are received) or in near-real-time, received REs over time and/or frequency and may determine over a period of time that certain tone patterns and/or associated overlay code(s) are better for the purpose of transmission of reference signals (RSs). In some cases, even RS tones used for data transmission can be interpreted as pilots after they are decoded. The receiver may also determine an overlay code (e.g., for MIMO system) associated with tone patterns used for reference signal transmissions. Once optimized tone patterns and/or associated overlay codes are determined, the receiver can then feed the optimized pattern and/or associated overlay code(s) back to a transmitter to be used for transmission of reference signals. Depending on the desired implementation, the transmitter may be associated with the same device as the receiver or may be associated with a different device, e.g., another base station 102 and/or UE 104.

Trained neural network 500 can log parameters, channel conditions, and/or other information (e.g., UE position, etc.), and can associate the same with various tone patterns (and/or corresponding overlay code(s)) used for reference signal transmission. As noted herein, the channel conditions can include indoor and/or outdoor channel conditions, UE mobility status, multipath channel characteristics, or any combination thereof, and/or other channel conditions. For example, the trained neural network 500 can remember which RS patterns were used for the logged information, so that they can be used in the future. Based on subsequent measurements and channel estimation processes, the trained neural network 500 can identify which tone patterns (and/or corresponding overlay code(s)) are best suited for a given set of parameters and channel conditions. In the future and upon occurrence or detection of such channel conditions, the trained neural network 500 is capable of identifying and using the best suited tone pattern(s) (and/or corresponding overlay code(s)) under the detected channel conditions for transmission of reference signals. In some examples, the trained neural network 500 may be continuously updated or retrained (e.g., using an online learning approach). For example, trained neural network 500 may be configured to be optimized each time reference signals are transmitted between the base station 102 and the UE 104 under various conditions.

As noted above, the output of the trained neural network, whether implemented at the base station 102 or the UE 104 can be a customized and new tone pattern not previously utilized for transmission of reference signals, or can be a previously utilized tone pattern determined to be the best tone pattern by the trained neural network 500 for the given set of one or more parameters provided as input. The output can further include a recommended OCC to be used in association with the transmission of a recommended tone pattern in a MIMO system.

Figure 6:
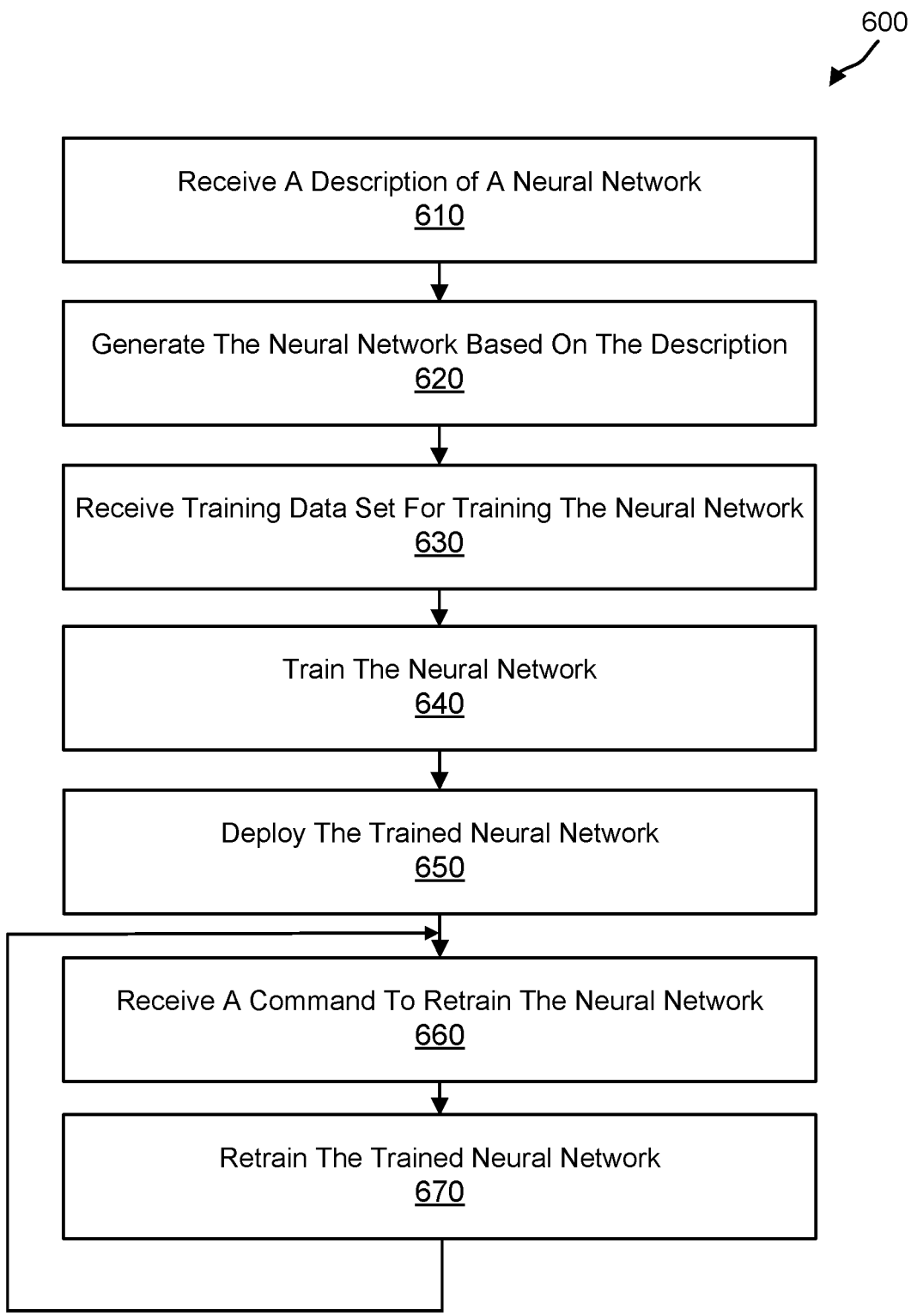
FIG. 6 is a flow chart illustrating an example of a process of training a machine learning algorithm for tone pattern and/or overlay codes determination, in accordance with some aspects of the present disclosure.

FIG. 6 is a flow chart of a process 600 of training a machine learning algorithm, such as neural network 500, for tone pattern and/or associated overlay codes, in accordance with some aspects of the present disclosure. Operation of FIG. 6 will be described in relation to FIG. 5 and can be implemented at the base station 102 and/or the UE 104. In one illustrative example, the UE 104 can perform the operations of FIG. 6 to determine a custom RS pattern. In one instance, if the RS pattern is for channel estimation, the UE can then determine the OCC overlay pattern. As described herein, the determination can be based on a rule (e.g., a rule in one or more 5G/NR 3GPP Technical Specifications or based on the output of a machine learning system).

At operation 610, the neural controller 501 receives a description of the structure of the neural network 500 (e.g., from base station 102) including, but not limited to, the architecture of the neural network 500 and definition of layers, layer interconnections, input and output descriptions, activation functions, operations, filters, parameters such as weights, coefficients, biases, etc. In some examples, the description can be received from a device based on a user input received by the device (e.g., input via an input device, such as a keyboard, mouse, touchscreen, interface, and/or other type of input device). In some examples, operation 610 is optional and may not be performed. For example, in some cases, the neural network 500 can be UE specific (e.g., executed by the UE) and thus the description and specific configurations of the neural network 500 may be provided by the UE 104.

At operation 620, the neural network 500 is generated based on the description received at operation 610. Using the description, neural controller 501 generates appropriate input, intermediate, and output layers with defined interconnections between the layers and/or any weights or coefficients assigned thereto. The weights and/or other coefficients can be set to initialized values, which will be modified during training, as described below. In some examples, operation 620 is optional and may not be performed in some cases (e.g., when the neural network 500 is UE specific).

At operation 630, once the neural network 500 is defined, a training data set is provided to the input layer 503 of the neural network 500. As described above, the training data set can include, but is not limited to, various tone patterns and/or associated overlay codes used for transmission of reference signals between the base station 102 and the UE 104, environmental conditions in which the base station 102 and the UE 104 are communicating reference signals using such tone patterns and EPRE values, as described above. Environmental conditions can include, but are not limited to, weather conditions, cellular or wireless connectivity, transmission capabilities and power of the base station 102 and/or the UE 104, etc., mobility status of the UE 104 (e.g., how fast the UE 104 is moving toward or away from the base station 102, etc.), indoor/outdoor conditions, multipath characteristics of the channel, etc. Furthermore, various measurements made by the base station 102 and/or the UE 104 using previously transmitted reference signals (e.g., tone patterns used in previous RBs for transmission of the reference signals, etc.), one or more measurements and associated throughputs made by the base station 102 and/or the UE 104 using the previously utilized tone patterns, a delta (difference) between measurements made by the base station 102 and/or the UE 104 using the different tone patterns, etc., may be utilized in training the neural network 500 For a MIMO system, the input data set can also include OCC patterns previously used in association with utilized tone patterns. In some examples, there may not be an explicitly dedicated training data set for the purpose of training the neural network or the training data set may not necessarily be a predetermined set of conditions and associated tone patterns and overlay codes. For instance, in some cases, the neural network 500 may instead (or in conjunction with) be trained using information associated with conditions under which the base station 102 and the UE 104 are communicating and transmitting reference signals using tone patterns and/or overlay codes. In such examples, the real-time data can be used for live training of the neural network 500, for example, using an online learning approach.

At operation 640, the neural network 500 is trained using the training data set. In one example, the training of the neural network 500 is an iterative process repeated multiple times and each time validated against a test data set. The test data set may include a set of one or more parameters similar to those used as part of the training dataset and associated output tone patterns. During each iteration, the output at the output layer 506 is compared to the test data set and a delta between the output at the output layer 506 at that iteration and the optimized output defined in the test data set is determined. The weights and other coefficients of the various layers can be adjusted based on the delta. The iterative process may continue until the delta for any given set of input parameters is less than a threshold. The threshold may be a configurable parameter determined based on experiments and/or empirical studies.

At operation 650 and once the neural network 500 is trained, the trained neural network 500 is deployed at the base station 102 and/or the UE 104. Once deployed at the base station 102 or the UE 104, the trained neural network can periodically determine tone patterns and/or associated OCC for MIMO systems, given a set of input parameters associated with the communication channel between the base station 102 and the UE 104. The periodicity of the tone pattern and/or associated OCC determination can depend on any number of factors including, but not limited to, configured periodicity for transmission of reference signals, e.g., every subframe or RB, every other subframe or RB, every frame, etc. As the channel condition or other parameters change, the receiving device (e.g., the base station 102 or the UE 104 on which the trained neural network 500 is deployed) can re-train the neural network 500 to determine optimized tone pattern and/or channel conditions for the new conditions.

At operation 660, a triggering condition for retraining the neural network 500 is detected. The command may be received after the trained neural network 500 is deployed and after each instance of determining a tone pattern and/or associated OCC for a reference signal. The parameters used as input, the tone pattern and/or corresponding OCC can be provided as part of the command received for retraining the neural network 500. In another example, the command may be received upon a detection of a triggering condition, which is described in more detail below with reference to FIGS. 7 and 9. Examples of such triggering conditions can further include, but are not limited to, a threshold degradation in performance of tone patterns recommended by the neural network 500 for transmission of reference signal (where the threshold may be determined based on experiments and/or empirical studies), channel estimation errors when a reference signal is used for channel estimation (e.g., when channel estimation error reaches and/or exceeds a configurable threshold more than a number of times over a period of time, with the number of times and the period of time being configurable parameters determined based on experiments and/or empirical studies), any combination thereof, and/or other condition.

At operation 670, the neural network 500 is retrained using the corresponding parameters used as input and the tone pattern received as part of the command at operation 660. The operation 660 and 670 for retraining the neural network 500 may be continuously repeated after the initial deployment of the trained neural network 500. For instance, each time the trained neural network 500 determines a tone pattern and/or associated OCC pattern for transmission of a particular reference signal, the corresponding parameters used as input, the determined tone pattern and/or the determined resource OCC pattern are used as additional training data for retraining and optimizing the trained neural network 500.

Figure 7:
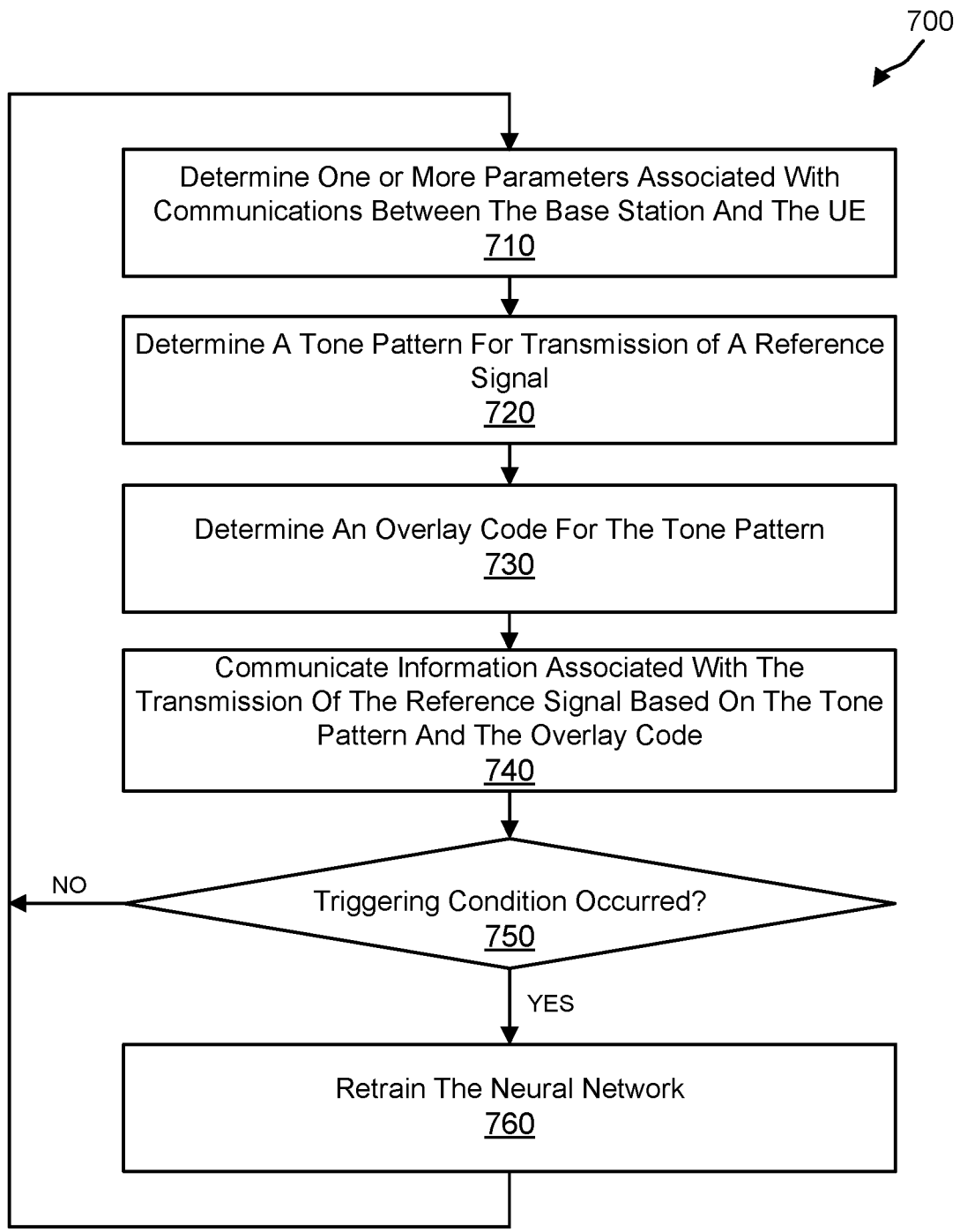
FIG. 7 is a flow chart illustrating an example of a process of communicating a customized tone pattern and/or associated overlay codes, in accordance with some aspects of the present disclosure.

FIG. 7 is a flow chart of a process 700 of communicating a customized tone pattern and/or associated overlay code, in accordance with some aspects of the present disclosure. The process 700 of FIG. 7 will be described from the perspective of the UE 104. It should be understood that the UE 104 may have one or more processors configured to execute one or more computer-readable instructions stored on one or more associated memories of the UE 104 to implement the steps of FIG. 7. In describing operations of FIG. 7, the UE 104 may be a receiving device and the base station 102 may be a transmitting device.

At operation 710, the UE 104 determines one or more parameters associated with communications between the base station 102 and the UE 104. Such communications between the base station 102 and the UE 104 can be over a communication channel used over a duration of time (e.g., current communication channel between the base station 102 and the UE 104). As described above, the one or more parameters include, but are not limited to, a location of the UE 104 (e.g., relative to the location of the base station 102), an environmental condition associated with the location of the UE 104, a location of the base station 102, indoor/outdoor channel conditions, multipath characteristics of the channel, an environmental condition associated with the location of the base station 102, a mobility status of the UE 104 (e.g., how fast the UE 104 is moving toward or away from the base station 102, etc.), various measurements made by the base station 102 and/or the UE 104 using previously transmitted reference signals (e.g., tone patterns used in previous RBs for transmission of reference signals), OCC patterns associated with previously utilized tone patterns, etc.

At operation 720, the UE 104 determines a tone pattern for a reference signal for use in future communication(s) between the base station 102 and the UE 104. In one example, the UE 104 determines the tone pattern based on the one or more parameters determined at operation 710. The tone pattern may identify one or more symbols and one or more locations within a resource block for the one or more symbols to be placed. In one example, the UE 104 may determine the tone pattern using the trained machine learning model (e.g., the trained neural network 500) of FIG. 5. As described above, the trained machine learning model can receive as input the one or more parameters determined at operation 710 and provide as output the tone pattern at operation 720. In another example, one or more signal processing techniques may be applied to determine the tone pattern. For example, the UE 104 can have advance receiver capabilities built therein allowing the UE 104 to use fewer tones for transmission of a reference signal (which can be used for channel estimation).

Figure 8A:
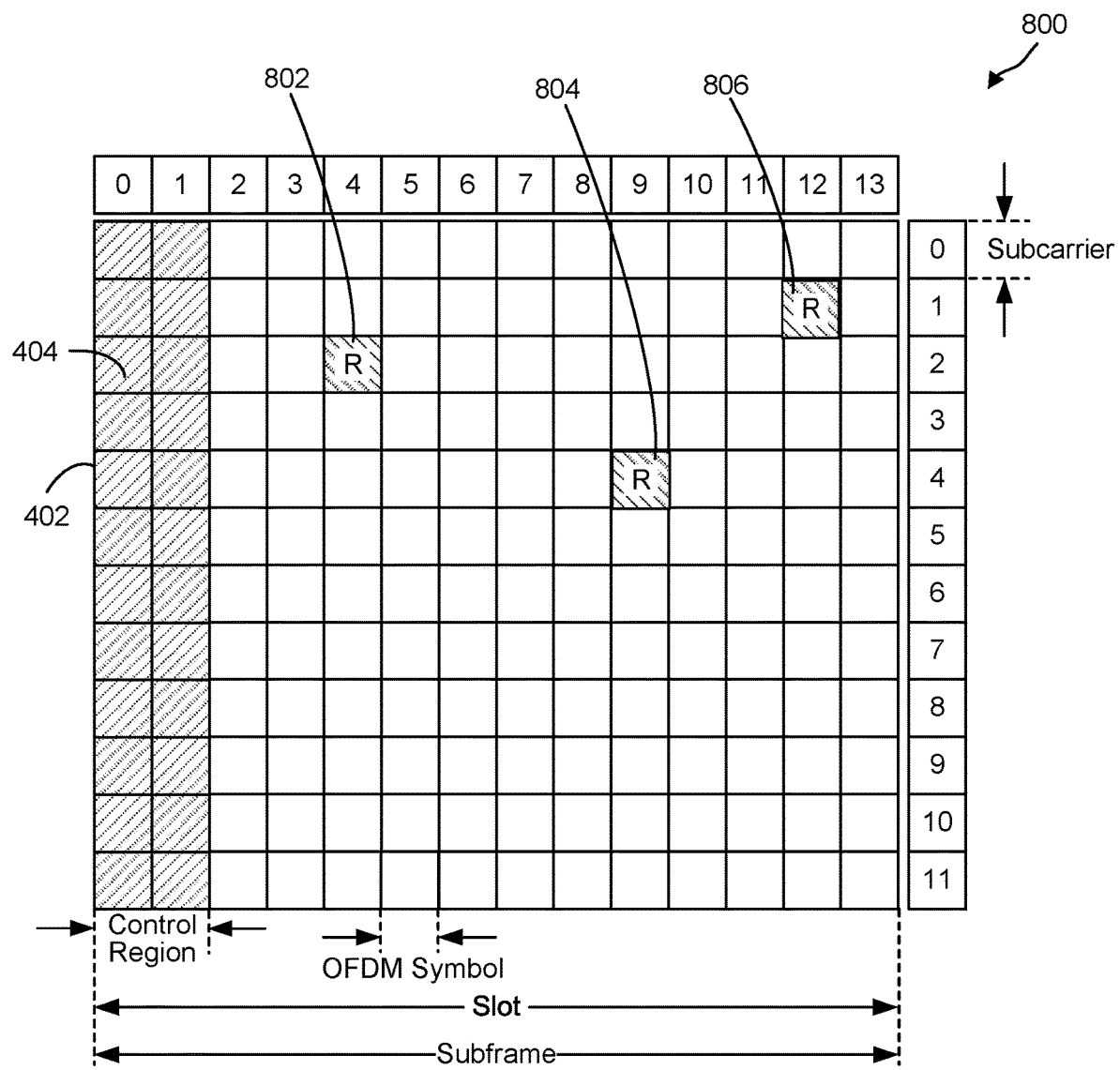
FIGS. 8A-C are conceptual diagrams illustrating non-limiting examples of customized irregular tone pattern arrangement, in accordance with some aspects of the present disclosure.

In some examples, the tone pattern can be for a DL-RS (e.g., a DL-De-Modulation Reference Signal (DMRS) or other DL reference signals) to be transmitted by the base station 102 to the UE 104. In some examples, the tone pattern can be for an UL-RS (e.g., an UP-DMRS or other reference signals) to be transmitted by the UE 104 to the base station 102. For example, the tone pattern determined at operation 720 can be a new tone pattern formed of irregular combination of REs and/or a customized arrangement of REs with different (time, frequency) coordinates. FIG. 8A is a diagram illustrating an example of a configuration 800 of the RB 402 of FIG. 4 having resource elements (REs) 404 as described above with reference to FIG. 4. The configuration 800 in FIG. 8A illustrates a customized irregular arrangement of REs including an RE 802, an RE 804, and RE 806. In contrast, the arrangement of the REs in FIG. 4 are pre-defined regular, as defined by the 3GPP standard. The REs 802, 804 and 806 shown in FIG. 8A are placed across the RB 402 without any set pattern (repetition or periodicity) to their placement within the RB 402. In the example configuration 800, the REs 802, 804 and 806 have (time, frequency) coordinates (2,4), (4,9), and (1,12), respectively and define a non-limiting example of a customized irregular tone pattern.

Figure 8B:
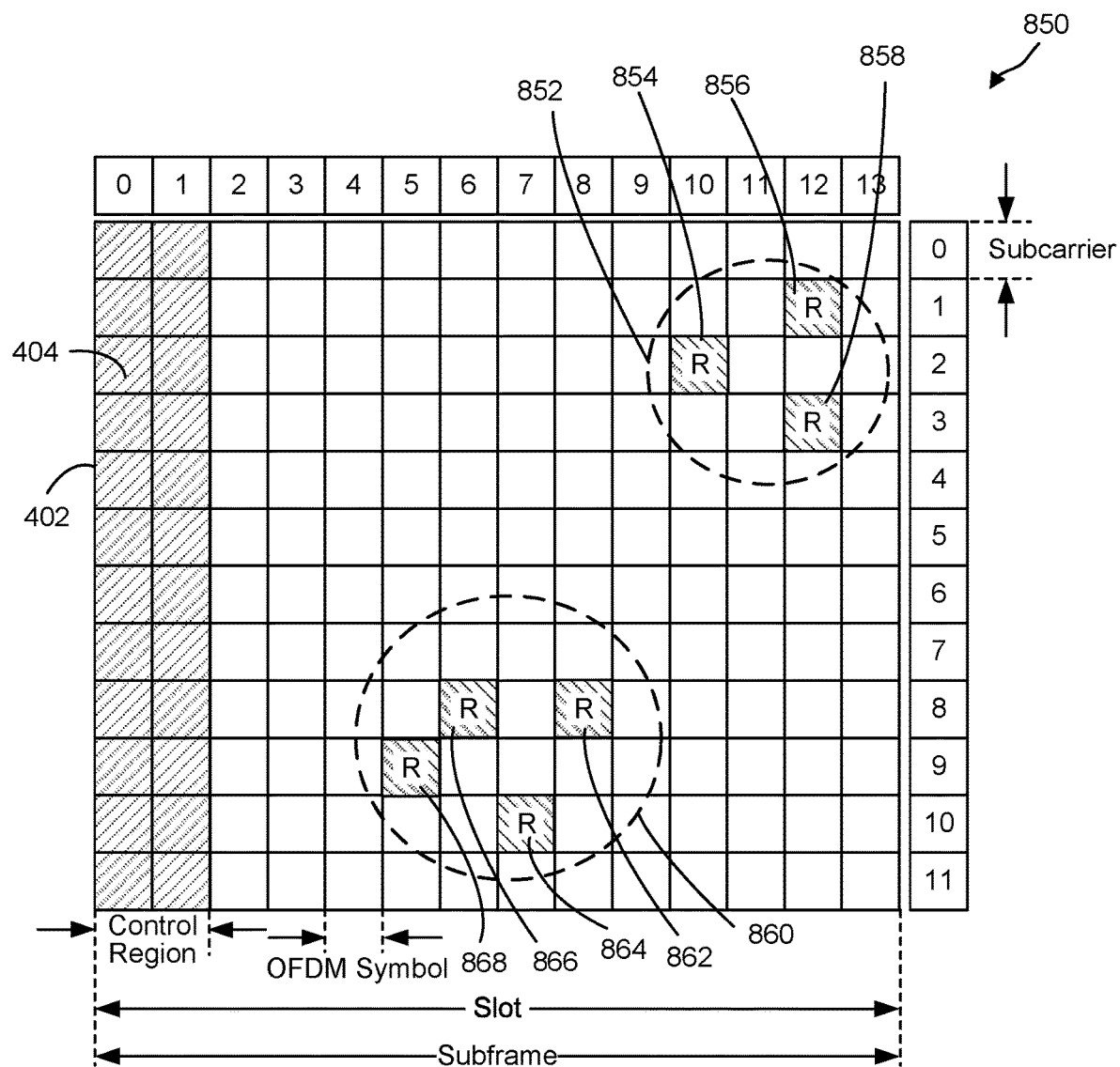

FIG. 8B is a diagram illustrating another example of a customized irregular tone arrangement shown as a configuration 850. In this example, a tone pattern of the configuration 850 is defined by two clusters of REs, including cluster 852 and cluster 860. The cluster 852 includes an RE 854, an RE 856 and an RE 858, while the cluster 860 includes an RE 862, an RE 864, an RE 866 and an RE 868. Each cluster may be defined by REs that are within a threshold location of one another in the RB 402 in time and/or in frequency. For example, the REs 854, 856 and 858 of the cluster 852 are separated by at most one subcarrier (time) and/or one OFDM symbol (frequency). Accordingly, the REs 854, 856 and 858 are within the threshold of two OFDM symbols and two subcarriers of each other. In another example, the REs 862, 864, 866 and 868 of the cluster 860 are separated by at most one subcarrier (time) and/or two OFDM symbols (frequency). Accordingly, the REs 862, 864, 866 and 868 are within the threshold of three OFDM symbols and two subcarriers of each other. Accordingly, the thresholds in time and frequency may not be the same and may be different as shown with reference to example clusters 852 and 860 of FIG. 8B.

The clusters of REs, such as the clusters 852 and 860, may also be referred to as clumps of REs. Furthermore, the cluster 852 can be referred to as including a first group of REs (i.e., the REs 854, 856 and 858) that are within a first set of time slots and a first set of frequency symbols (e.g., the REs 854, 856 and 858 are within time slots (subcarriers) 1-3 and frequency symbols (OFDM symbols) 10-12). The cluster 860 can be referred to as including a second group of REs (i.e., the REs 862, 864, 866, and 868) that are within a second set of time slots and a second set of frequency symbols (e.g., the REs 862, 864, 866, and 868 are within time slots (subcarriers) 8-10 and frequency symbols (OFDM symbols) 5-8). In another example, each of clusters 852 and 860 can include one RE instead of multiple REs as shown in FIG. 8B. In another example, the cluster 852 can include on RE while the cluster 860 includes multiple REs (e.g., the REs 862, 864, 866, and 868) as shown in FIG. 8B. In another example, the cluster 852 can include multiple REs (e.g., the REs 854, 856 and 858) as shown in FIG. 8B while the cluster 860 includes one RE. In another example, each of the clusters 852 and 860 can have the same number of REs or different number of REs. While FIG. 8B illustrates two example clusters as forming an example tone pattern, the present disclosure is not limited thereto and a tone pattern may be formed of a single cluster or more than two clusters.

Figure 8C:
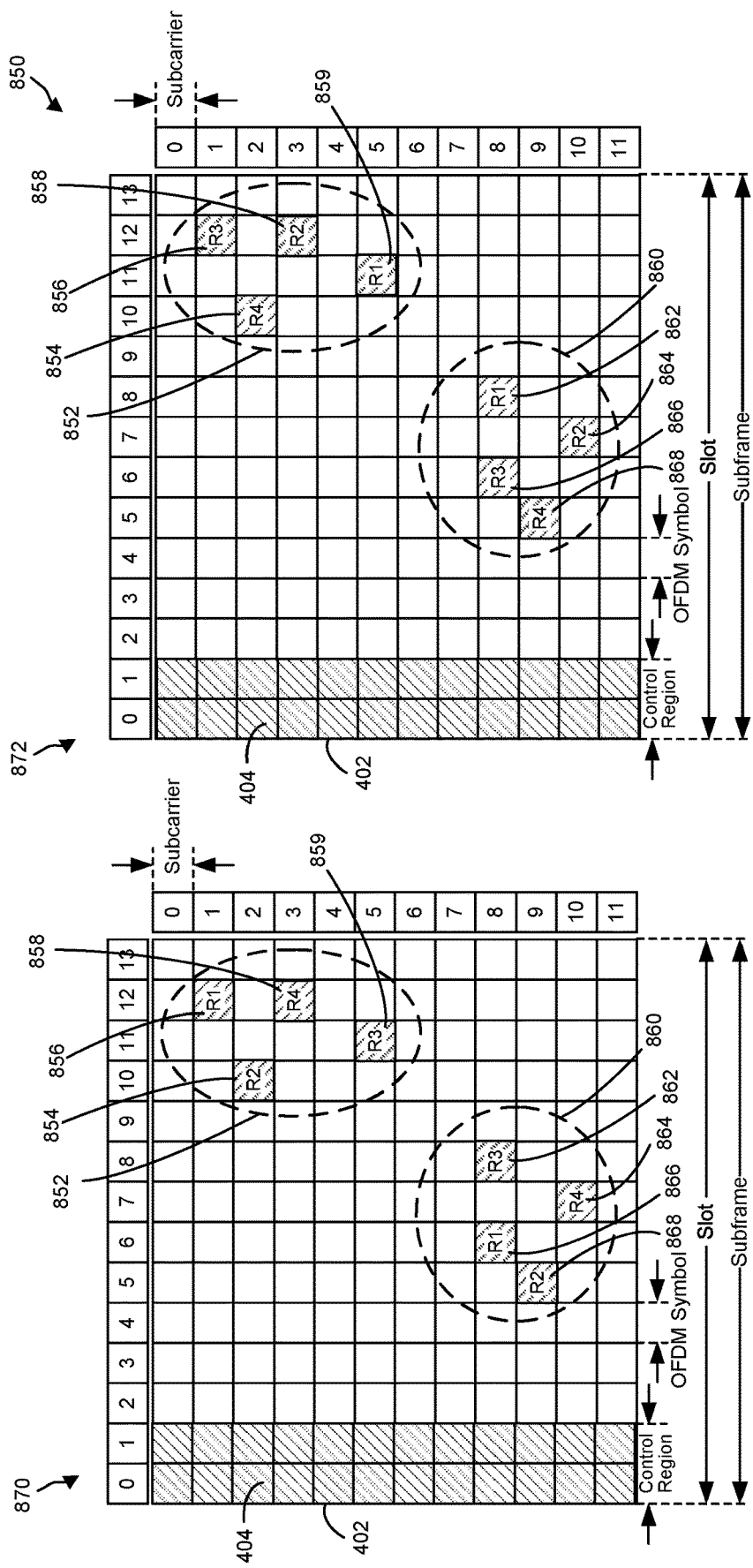

In a MIMO system such as a system having four or eight antenna ports as shown in FIGS. 4B and 4C, respectively, the tone pattern determined at operation 720 can be multiplexed (e.g., using FDM) such that each RE of the tone pattern is shared by multiple antennas (e.g., four antennas, etc.). FIG. 8C illustrates a multiplexed tone pattern for a four antenna MIMO system similar to the system described with reference to FIG. 4B. FIG. 8C includes two illustrations 870 and 872 of the RB 402. In this instance, each RE in the cluster 852 is shared by two of the four antennas (e.g., antennas 1000, 1001, 1002, and 1003). For example, the RE 854 is shared by antenna 1001 (the "R2" designation in the illustration 870 corresponds to antenna 1001) and antenna 1003 (the "R4" designation in the illustration 872 corresponds to antenna 1003). The RE 856 is shared by antenna 1000 (the "R1" designation in the illustration 870 corresponds to antenna 1000) and antenna 1002 (the "R3" designation in the illustration 872 corresponds to antenna 1002). The RE 858 is shared by antenna 1003 (the "R4" designation in the illustration 870 corresponds to antenna 1003) and antenna 1001 (the "R2" designation in the illustration 872 corresponds to antenna 1003). The RE 859 is shared by antenna 1002 (the "R3" designation in the illustration 870 corresponds to antenna 1002) and antenna 1000 (the "R1" designation in the illustration 872 corresponds to antenna 1000).

Similarly, each RE in the cluster 860 is shared by two of the four antennas (e.g., antennas 1000, 1001, 1002, and 1003). For example, the RE 862 is shared by antenna 1002 (the "R3" designation in the illustration 870 corresponds to antenna 1002) and antenna 1000 (the "R1" designation in the illustration 872 corresponds to antenna 1000). The RE 864 is shared by antenna 1003 (the "R4" designation in the illustration 870 corresponds to antenna 1003) and antenna 1001 (the "R2" designation in the illustration 872 corresponds to antenna 1001). The RE 866 is shared by antenna 1000 (the "R1" designation in the illustration 870 corresponds to antenna 1000) and antenna 1002 (the "R2" designation in the illustration 872 corresponds to antenna 1002). The RE 868 is shared by antenna 1001 (the "R2" designation in the illustration 870 corresponds to antenna 1001) and antenna 1003 (the "R4" designation in the illustration 872 corresponds to antenna 1003). As described in more detail below, an OCC for the example tone pattern of FIG. 8C may be a length-4 (2-by-2) Walsh code described above (e.g., $\{1, 1, 1, 1\}$, $\{1, -1, -1, 1\}$, $\{1, 1, -1, -1\}$, and $\{1, -1, 1, -1\}$).

In another example, the tone pattern can be a regular tone pattern, which has not been defined in the standards by the 3GPP standards. In another example, the tone pattern can be one of a plurality of existing tone patterns defined by the 3GPP standard. Examples of existing tone patterns are shown in FIGS. 4A-C. The existing tone patterns of FIGS. 4A-C are examples of a pre-defined regular arrangement of REs for different tone pattern (e.g., a one OFDM based DMRS of FIG. 4B, a two OFDM based DMRS of FIG. 4C, etc.). In another example, the tone pattern can be a regular tone pattern, which has not been defined in the standards by the 3GPP standards.

At operation 730, the UE 104 can determine an OCC pattern (an overlay code) for the tone pattern determined at operation 720. In one example, the UE 104 can determine the OCC based on a rule in the technical specification (TS) of the 5G standard (e.g., in Rel. 15, 16, and/or 17). For example, the UE 104 can determine a location of each RE that is part of the DMRS pattern determined at operation 720 and apply a rule. In one example, the rule can be a "time first, frequency first" rule. According to a "time first, frequency first" rule, the OCC assignment starts from the REs that are first in time and/or frequency and sequentially moves to the remaining REs that form the tone pattern at operation 720. For instance and with reference to clump 860, "time first, frequency first" would result in an OCC pattern, where length-4 Walsh code is applied to the REs in the clump 860 starting with the left most (time first) and down-most (frequency first) RE. In other words, such length-4 Walsh code may be applied such that $\{1, 1, 1, 1\}$ is applied to RE 868 ("R2"), $\{1, -1, 1, -1\}$ is applied to RE 866 ("R1"), $\{1, 1, -1, -1\}$ is applied to RE 864 ("R4"), and $\{1, -1, 1, -1\}$ is applied to RE 862 ("R3"). In a "time first, frequency first" rule, if there are multiple tones per OFDM symbol, OCC codes are assigned to the lowest frequency tone first followed sequentially by higher frequency tones. In another example, the UE 104 may determine the OCC pattern using a trained machine learning model (e.g., the trained neural network 500 of FIG. 5). The trained machine learning model can receive, as input, the tone pattern determined at operation 720 and provide as output the OCC pattern to be used in association with the tone pattern.

At operation 740, the UE 104 may communicate information associated with the transmission of the reference signal using the tone pattern determined at operation 720 and/or the overlay code (e.g., the OCC pattern determined at operation 730). In one example, the tone pattern determined at operation 720 can be a tone pattern for a DL DMRS. In such an example, the UE 104 may communicate the reference signal by communicating (e.g., sending or transmitting) the tone pattern and the OCC pattern to the base station 102 in order for the base station 102 to utilize the tone pattern and the OCC code to transmit a DMRS on the downlink channel. The UE 104 may transmit the tone pattern and the OCC pattern to the base station 102 over one or more of a Physical Uplink Control Channel (PUCCH), MAC Control Element (MAC-CE), or Radio Resource Control layer. In another example, the UE 104 may communicate (e.g., send or transmit) only the tone pattern to the base station 102 and the base station 102 determines the associated OCC pattern. In this instance, the UE 104 may skip the operation 730. In another example, the tone pattern determined at operation 720 can be a tone pattern for an UL DMRS. In this instance, the UE 104 may transmit the reference signal to the base station 102 using the tone pattern determined at operation 720 and/or the OCC pattern determined at operation 730.

At operation 750, the UE 104 can determine if a triggering condition for retraining the neural network 500 has occurred. In one example, the triggering condition can be a change in the mobility status of the UE 104. In another example, the triggering condition can be the determination of the tone pattern at operation 720 and/or the determination of the associated OCC pattern at operation 70. Examples of such triggering conditions can further include, but are not limited to, a threshold degradation in performance of tone patterns recommended by the neural network 500 for transmission of reference signal (where the threshold may be determined based on experiments and/or empirical studies), channel estimation errors when a reference signal is used for channel estimation (e.g., when channel estimation error reaches and/or exceeds a configurable threshold more than a number of times over a period of time, with the number of times and the period of time being configurable parameters determined based on experiments and/or empirical studies), any combination thereof, and/or other condition.

If, at operation 750, the UE 104 determines that a triggering condition has not occurred, the process 700 reverts back to operation 710 and operations 710 through 750 may be periodically repeated, for example, depending on the frequency of transmission of reference signals between the base station 102 and the UE 104 (e.g., every subframe (lms), every other subframe, etc.). However, if at operation 750, the UE 104 determines that the triggering condition has occurred, at operation 760, the UE 104 can retrain the neural network 500 per operations 660 and 670 of FIG. 6 described above. For instance, the one or more parameters determined at operation 710, the tone pattern determined at operation 720 and/or the OCC pattern determined at operation 730 may be provided as input to the input layer 503 of the neural network 500 for retraining the neural network 500. In one example, the retraining may involve adjusting coefficients, biases and/or weights of different nodes (e.g., nodes 508A, 508B, 508C) at different network layers of the neural network 500. Thereafter, the process 700 may revert back to operation 710 and the UE 104 may perform the process of FIG. 7 periodically depending on the frequency of transmission of reference signals between the base station 102 and the UE 104 (e.g., every subframe (1 ms), every other subframe, etc.).

Figure 9:
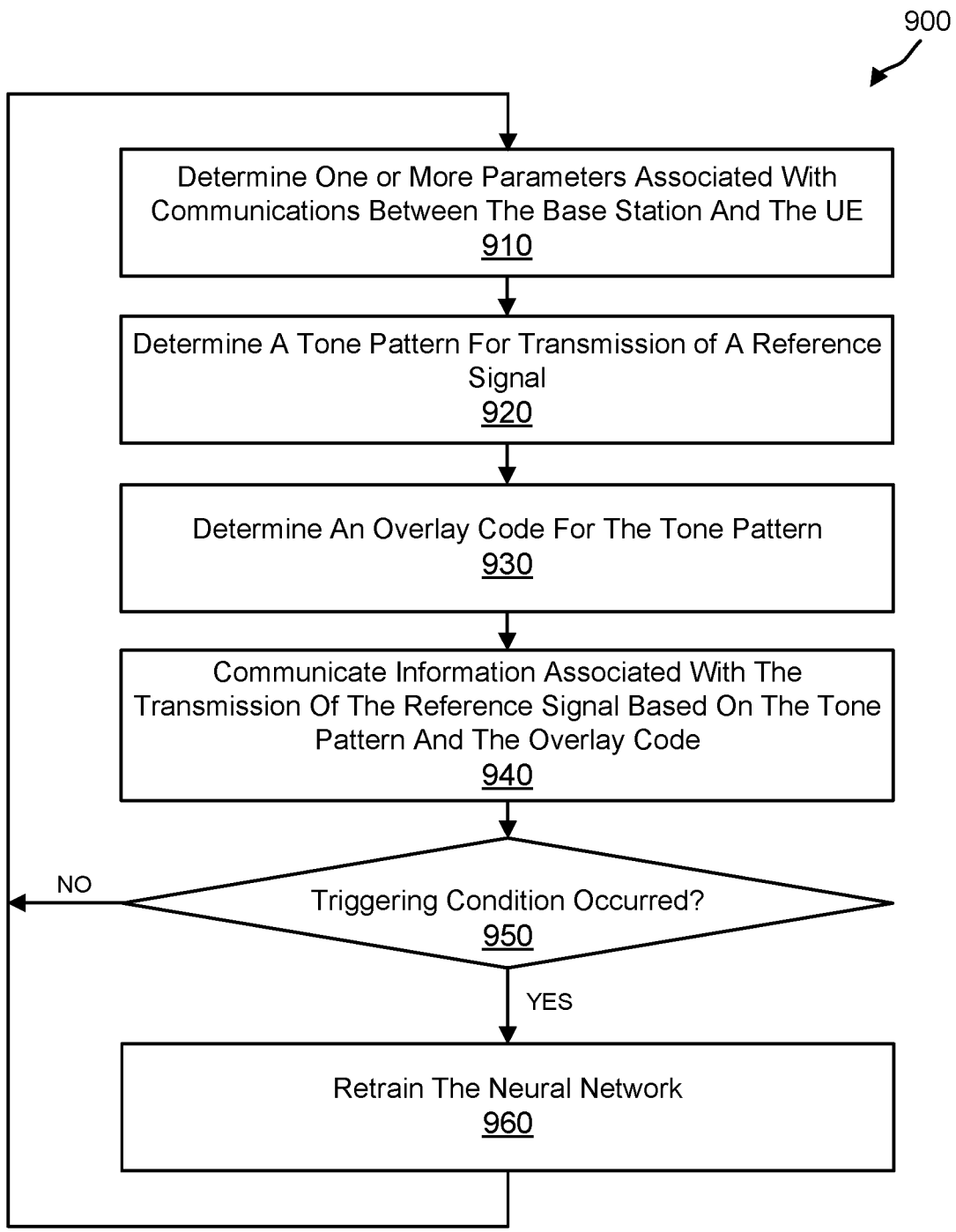
FIG. 9 is a flow chart illustrating an example of a process of communicating a customized tone pattern and/or associated overlay codes, in accordance with some aspects of the present disclosure.

As noted above, the process of determining a tone pattern and/or associated OCC pattern using the trained neural network 500 of FIG. 5 may be performed at the base station 102. FIG. 9 is a flow chart of a process 900 of communicating a customized tone pattern and/or associated overlay codes, in accordance with some aspects of the present disclosure. The process 900 of FIG. 9 will be described from the perspective of the base station 102. It should be understood that the base station 102 may have one or more processors configured to execute one or more computer-readable instructions stored on one or more associated memories of the base station 102 to implement the steps of FIG. 9. In describing operations of FIG. 9, the base station 102 may be a receiving device and the UE 104 may be a transmitting device.

At operation 910, the base station 102 determines one or more parameters associated with communications between the base station 102 and the UE 104. Such communications between the base station 102 and the UE 104 can be over a communication channel used over a duration of time (e.g., current communication channel between the base station 102 and the UE 104). As described above, the one or more parameters include, but are not limited to, a location of the UE 104, (e.g., relative to the location of the base station 102), indoor/outdoor channel conditions, multipath characteristics of the channel, an environmental condition associated with the location of the UE 104, a location of the base station 102, an environmental condition associated with the location of the base station 102, a mobility status of the UE 104 (e.g., how fast the UE 104 is moving toward or away from the base station 102, etc.), various measurements made by the base station 102 and/or the UE 104 using previously transmitted reference signals (e.g., tone patterns used in previous RBs for transmission of reference signals), OCC patterns associated with previously utilized tone patterns, etc.

At operation 920, the base station 102 determines a tone pattern for a reference signal for use in future communication(s) between the base station 102 and the UE 104. In one example, the base station 102 determines the tone pattern based on the one or more parameters determined at operation 910. The tone pattern may identify one or more symbols and one or more locations within a resource block for the one or more symbols to be placed. In one example, the base station 102 may determine the tone pattern using the trained machine learning model (the trained neural network 500) of FIG. 5. As described above, the trained machine learning model can receive as input the one or more parameters determined at operation 910 and provide as output the tone pattern at operation 920. In another example, one or more signal processing may be applied to determine the tone pattern. For example, the UE 104 can have advanced receiver capabilities built therein allowing the UE 104 to use fewer tones for a reference signal, (which can be used for channel estimation).

In some examples, the tone pattern can be for a DL-RS (e.g., a DL-DMRS or other DL reference signals) to be transmitted by the base station 102 to the UE 104. In some examples, the tone pattern can be for an UL-RS (e.g., an UP-DMRS or other reference signals) to be transmitted by the UE 104 to the base station 102. In some examples, the tone pattern can be a customized irregular arrangement of REs (irregular combination of REs) with different (time, frequency) coordinates. Three non-limiting examples of customized irregular arrangement of tones have been described above with reference to FIGS. 8A-C.

In some examples, the tone pattern can be a regular tone pattern (e.g., with a defined and repeatable arrangement of REs), which has not been defined in the standards by the 3GPP standards. In some examples, the tone pattern can be one of a plurality of existing tone patterns defined by the 3GPP standard. Examples of existing tone pattern are shown in FIGS. 4A-C. The existing tone patterns of FIGS. 4A-C are examples of a pre-defined regular arrangement of REs for different tone patterns (e.g., a one OFDM based DMRS of FIG. 4B, a two OFDM based DMRS of FIG. 4C, etc.).

At operation 930, the base station 102 can determine an OCC pattern (an overlay code) for the tone pattern determined at operation 920. In one example, the base station 102 can determine the OCC based on a rule in the technical specification (TS) of the 5G standard (e.g., in Rel. 15, 16, and/or 17). For example, the base station 102 can determine a location of each RE that is part of the DMRS pattern determined at operation 920 and apply a rule. In one example, the rule can be a "time first, frequency first" rule. According to a "time first, frequency first" rule, the OCC assignment starts from the REs that are first in time and/or frequency and sequentially moves to the remaining REs that form the tone patter at operation 920. For instance and with reference to clump 860, "time first, frequency first" would result in an OCC pattern, where length-4 Walsh code is applied to the REs in the clump 860 starting with the left most (time first) and down-most (frequency first) RE. In other words, such length-4 Walsh code may be applied such that {1, 1, 1, 1} is applied to RE 868 ("R2"), {1, -1, 1, -1} is applied to RE 866 ("R1"), {1, 1, -1, -1} is applied to RE 864 ("R4"), and {1, -1, 1, -1} is applied to RE 862 ("R3"). In a "time first, frequency first" rule, if there are multiple tones per OFDM symbol, OCC codes are assigned to the lowest frequency tone first followed sequentially by higher frequency tones. In another example, the base station 102 may determine the OCC pattern using a trained machine learning model (e.g., the trained neural network 500 of FIG. 5). The trained machine learning model can receive as input, the tone pattern determined at operation 920 and provide as output the OCC pattern to be used in association with the tone pattern.

At operation 940, the base station 102 may facilitate transmission of the reference signal using the tone pattern determined at operation 920 and/or the overlay code (e.g., the OCC pattern determined at operation 930). In one example, the tone pattern determined at operation 920 can be a tone pattern for an UL DMRS. In this instance, the base station 102 may facilitate the transmission of the reference signal by transmitting the tone pattern and the OCC pattern to the UE 104 in order for the UE 104 to utilize the tone pattern and the OCC code to transmit a DMRS on the uplink channel. The base station 102 may transmit the tone pattern and the OCC pattern to the base station 102 over one or more of a Physical Downlink Control Channel (PDCCH), MAC Control Element (MAC-CE), or Radio Resource Control layer. In another example, the base station 102 may transmit the tone pattern to the UE 104 and the UE 104 can determine the associated OCC pattern. In this instance, the base station 102 may skip the operation 930. In another example, the tone pattern determined at operation 920 can be a tone pattern for an DL DMRS. In this instance, the base statin 102 may transmit the reference signal to the UE 104 using the tone pattern determined at operation 920 and/or the OCC pattern determined at operation 930.

At operation 950, the base station 102 can determine if a triggering condition for retraining the neural network 500 has occurred. In one example, the triggering condition can be a change in the mobility status of the UE 104. In another example, the triggering condition can be the determination of the tone pattern at operation 920 and/or the determination of the associated OCC pattern. Examples of such triggering conditions can further include, but are not limited to, a threshold degradation in performance of tone patterns recommended by the neural network 500 for transmission of reference signal/s (where the threshold may be determined based on experiments and/or empirical studies), and/or channel estimation errors when a reference signal is used for channel estimation (e.g., when channel estimation error reaches and/or exceeds a configurable threshold more than a number of times over a period of time, with the number of times and the period of time being configurable parameters determined based on experiments and/or empirical studies), any combination thereof, and/or other condition.

If, at operation 950, the base station 102 determines that a triggering condition has not occurred, the process 900 reverts back to operation 910 and operations 910 through 950 may be periodically repeated, for example, depending on the frequency of transmission of reference signals between the base station 102 and the UE 104 (e.g., every subframe (1 ms), every other subframe, etc.). However, if at operation 950, the base station 102 determines that the triggering condition has occurred, at operation 960, the base station 102 retrains the neural network 500 per operations 660 and 670 of FIG. 6 described above. For instance, the one or more parameters determined at operation 910, the tone pattern determined at operation 920 and/or the associated OCC pattern determined at operation 930 may be provided as input to the input layer 503 of the neural network 500 for retraining the neural network 500. In one example, the retraining may involve adjusting coefficients, biases and/or weights of different nodes (e.g., nodes 508A, 508B, 508C) at different network layers of the neural network 500. Thereafter, the process 900 may revert back to operation 910 and the base station 102 may perform the process of FIG. 9 periodically depending on the frequency of transmission of reference signals between the base station 102 and the UE 104 (e.g., every subframe (1 ms), every other subframe, etc.).

FIG. 10 is a flow chart of an example process 1000 of communicating a customized tone pattern and/or associated overlay codes for transmission of reference signals, in accordance with some aspects of the present disclosure. The process 1000 of FIG. 10 is described from the perspective of a receiving device, which can be the base station 102 or the UE 104. Furthermore, a transmitting device referenced in description of FIG. 10, can be one of the base station 102 or the UE 104. At operation 1010, the process includes determining, by a receiving device, a tone pattern for a reference signal for use in wireless communications between the receiving device and a transmitting device. In some cases, the tone pattern can include an irregular combination of resource elements in one or more resource blocks for the reference signal (e.g., as described with respect to FIGS. 8A-8C). The resource elements can be shared by a plurality of antennas for communication of one or more reference signals between at least the transmitting device and the receiving device (e.g., between user equipment and a base station, such as shown in FIGS. 4A-4C).

In some cases, the irregular combination of resource elements can include a first group of resource elements associated with a first set of time slots and a first set of frequency symbols and a second group of resource elements associated with a second set of time slots and a second set of frequency symbols. In some cases, the first group can include one or more resource elements and the second group includes one or more resource elements that are different than the one or more resource elements in the first group. In some cases, the first group can include a plurality of resource elements (e.g., the cluster 852 of FIG. 8B or 8C). In some cases, the second group can include a plurality of resource elements (e.g., the cluster 860 of FIG. 8B or 8C). In some cases, the first group can include a first plurality of resource elements and the second group can include a second plurality of resource elements.

At operation 1020, the process includes determining, by the receiving device, an overlay code for the tone pattern. In some cases, the overlay code can be determined using a machine learning model (e.g., using the neural network 500 of FIG. 5). In some cases, the overlay code can be determined using a rule. For example, the rule can identify which resource elements of the one or more resource blocks are to be used for the tone pattern relative to pilot resource elements in each of the one or more resource blocks.

At operation 1030, the process includes communicating, by the receiving device, information associated with a transmission of the reference signal using the tone pattern and the overlay code. In some cases, the receiving device is a user equipment and the transmitting device is a base station. In some cases, the receiving device is a base station and the transmitting device is a user equipment. In some cases, facilitating the transmission of the reference signal can include transmitting, by the receiving device, the tone pattern and the overlay code to the transmitting device to be used for transmission of the reference signal by the transmitting device. In some cases, the tone pattern can be transmitted, during uplink transmission, over one or more of a Physical Uplink Control Channel (PUCCH), MAC Control Element (MAC-CE), or Radio Resource Control layer. In some cases, the tone pattern can be transmitted, during downlink transmission, over one or more of a Physical Downlink Control Channel (PDCCH), MAC Control Element (MAC-CE), or Radio Resource Control layer. In some cases, facilitating the transmission of the reference signal can include transmitted the reference signal, using the tone pattern and the overlay code, from the receiving device to the transmitting device. In some cases, the reference signal is a Demodulation Reference Signal (DMRS).

Figure 11:
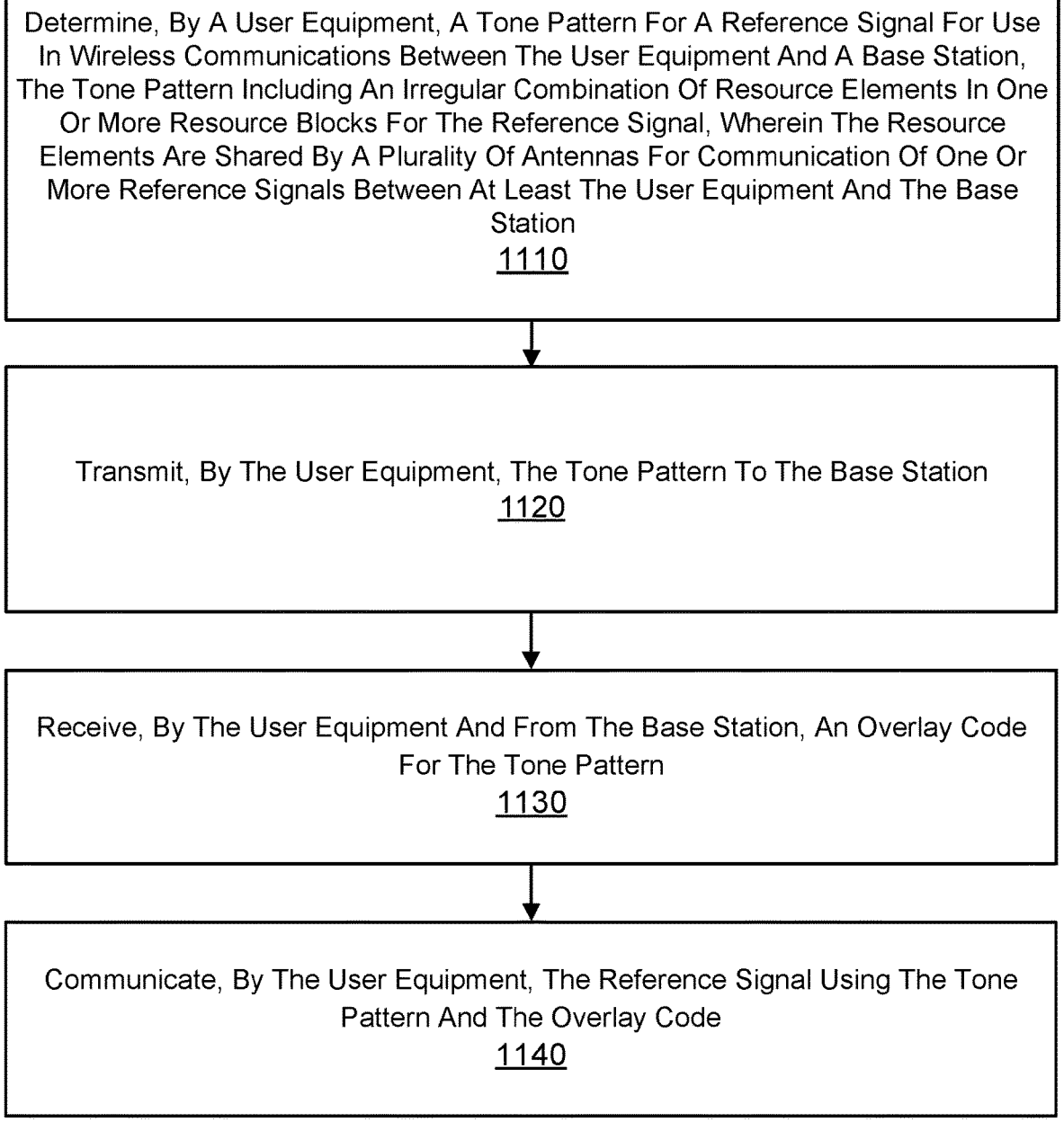
FIG. 11 is a flow chart illustrating an example of a process of communicating a customized tone pattern and associated overlay codes, in accordance with some aspects of the present disclosure

FIG. 11 is a flow chart of an example process 1100 of communicating a customized tone pattern and/or associated overlay codes for transmission of reference signals, in accordance with some aspects of the present disclosure. The process 1100 of FIG. 11 is described from the perspective of a user equipment such as the UE 104. At operation 1110, the process 1100 includes determining, by a user equipment, a tone pattern for a reference signal for use in wireless communications between the user equipment and a base station. In some cases, the tone pattern can include an irregular combination of resource elements in one or more resource blocks for the reference signal (e.g., as described with respect to FIGS. 8A-8C). The resource elements can be shared by a plurality of antennas for communication of reference signals between at least the user equipment and the base station (e.g., as shown in FIGS. 4A-4C).

In some cases, the irregular combination of resource elements can include a first group of resource elements associated with a first set of time slots and a first set of frequency symbols and a second group of resource elements associated with a second set of time slots and a second set of frequency symbols. In some cases, the first group can include one or more resource elements and the second group includes one or more resource elements that are different than the one or more resource elements in the first group. In some cases, the first group can include a plurality of resource elements (e.g., the cluster 852 of FIG. 8B or 8C). In some cases, the second group can include a plurality of resource elements (e.g., the cluster 860 of FIG. 8B or 8C). In some cases, the first group can include a first plurality of resource elements and the second group can include a second plurality of resource elements.

At operation 1120, the process 1100 includes transmitting, by the user equipment, the tone pattern to the base station. In response to receiving the tone pattern, the base station can determine an overlay code for the tone pattern. In some cases, the overlay code can be determined using a machine learning model (e.g., using the neural network 500 of FIG. 5). In some cases, the overlay code can be determined using a rule. For example, the rule can identify which resource elements of the one or more resource blocks are to be used for the tone pattern relative to pilot resource elements in each of the one or more resource blocks.

At operation 1130, the process 1100 includes receiving, by the user equipment and from the base station, an overlay code for the tone pattern. In some cases, the tone pattern can be transmitted, during uplink transmission, over one or more of a Physical Uplink Control Channel (PUCCH), MAC Control Element (MAC-CE), or Radio Resource Control layer. At operation 1140, the process 1100 includes communicating, by the user equipment, the reference signal using the tone pattern and the overlay code. In some cases, the reference signal is a Demodulation Reference Signal (DMRS).

With various examples of tone pattern optimization described above with reference to FIGS. 4-11, FIG. 12 will now be described illustrating components of the UE 104.

Figure 12:
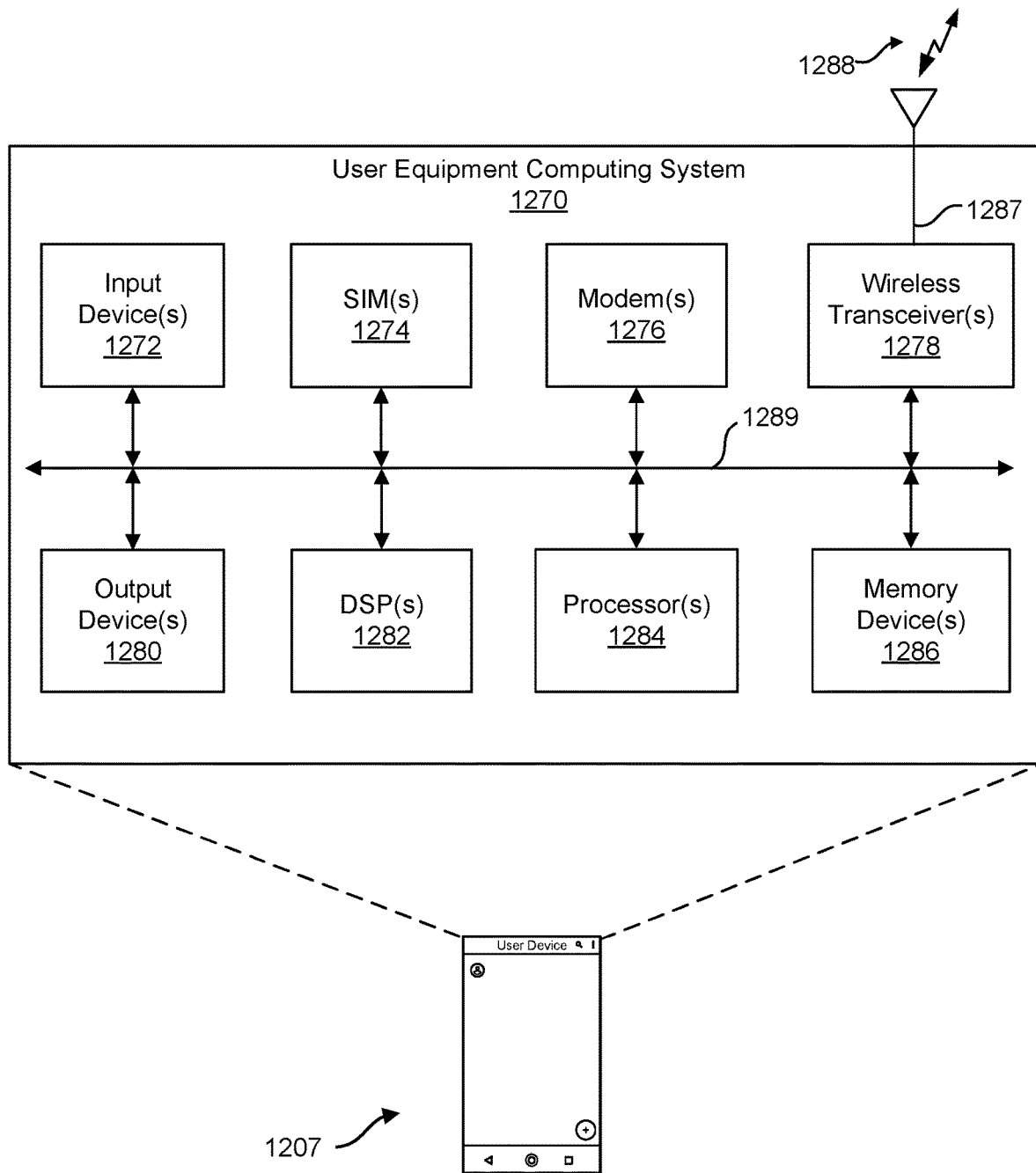
FIG. 12 is a diagram illustrating example computing system of a user equipment (UE) device, according to some aspects of the present disclosure.

FIG. 12 illustrates an example of a computing system 1270 of a user equipment (UE) 1207. UE 1207 may be the same as the UE 104 described above with reference to FIGS. 1-10. In some examples, the UE 1207 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 1270 includes software and hardware components that can be electrically coupled via a bus 1289 (or may otherwise be in communication, as appropriate). For example, the computing system 1270 includes one or more processors 1284. The one or more processors 1284 can include one or more CPUs, ASICs, FPGAs, APs, GPUs, VPUs, NSPs, microcontrollers, dedicated hardware, any combination thereof, and/or other processing device or system. The bus 1289 can be used by the one or more processors 1284 to communicate between cores and/or with the one or more memory devices 1286.

The computing system 1270 may also include one or more memory devices 1286, one or more digital signal processors (DSPs) 1282, one or more subscriber identity modules (SIMS) 1274, one or more modems 1276, one or more wireless transceivers 1278, an antenna 1287, one or more input devices 1272 (e.g., a camera, a mouse, a keyboard, a touch sensitive screen, a touch pad, a keypad, a microphone, and/or the like), and one or more output devices 1280 (e.g., a display, a speaker, a printer, and/or the like).

The one or more wireless transceivers 1278 can transmit and receive wireless signals (e.g., signal 1288) via antenna 1287 to and from one or more other devices, such as one or more other UEs, network devices (e.g., base stations such as eNBs and/or gNBs, WiFi routers, etc.), cloud networks, and/or the like. As described herein, the one or more wireless transceivers 1278 can include a combined transmitter/receiver, discrete transmitters, discrete receivers, or any combination thereof. In some examples, the computing system 1270 can include multiple antennae. The wireless signal 1288 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 1278 may include an radio frequency (RF) front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 1288 into a baseband or intermediate frequency and can convert the RF signals to the digital domain.

In some cases, the computing system 1270 can include a coding-decoding device (or CODEC) configured to encode and/or decode data transmitted and/or received using the one or more wireless transceivers 1278. In some cases, the computing system 1270 can include an encryption-decryption device or component configured to encrypt and/or decrypt data (e.g., according to the AES and/or DES standard) transmitted and/or received by the one or more wireless transceivers 1278.

The one or more SIMS 1274 can each securely store an International Mobile Subscriber Identity (IMSI) number and a related key assigned to the user of the UE 1207. The IMSI and the key can be used to identify and authenticate the subscriber when accessing a network provided by a network service provider or operator associated with the one or more SIMS 1274. The one or more modems 1276 can modulate one or more signals to encode information for transmission using the one or more wireless transceivers 1278. The one or more modems 1276 can also demodulate signals received by the one or more wireless transceivers 1278 in order to decode the transmitted information. In some examples, the one or more modems 1276 can include a 4G (or LTE) modem, a 5G (or NR) modem, a Bluetooth™ modem, a modem configured for vehicle-to-everything (V2X) communications, and/or other types of modems. In some examples, the one or more modems 1276 and the one or more wireless transceivers 1278 can be used for communicating data for the one or more SIMS 1274.

The computing system 1270 can also include (and/or be in communication with) one or more non-transitory machine-readable storage media or storage devices (e.g., one or more memory devices 1286), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 1286 and executed by the one or more processor(s) 1284 and/or the one or more DSPs 1282. The computing system 1270 can also include software elements (e.g., located within the one or more memory devices 1286), including, for example, an operating system, device drivers, executable libraries, and/or other code, such as one or more application programs, which may comprise computer programs implementing the functions provided by various embodiments, and/or may be designed to implement methods and/or configure systems, as described herein.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, and source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The foregoing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A method for wireless communication includes determining, by a receiving device, a tone pattern for a reference signal for use in wireless communications between the receiving device and a transmitting device, the tone pattern including an irregular combination of resource elements in one or more resource blocks for the reference signal, wherein the resource elements are shared by a plurality of antennas for communication of one or more reference signals between at least the transmitting device and the receiving device; determining, by the receiving device, an overlay code for the tone pattern; and communicating, by the receiving device, information associated with transmission of the reference signal using the tone pattern and the overlay code.

Aspect 2: The method of aspect 1, wherein the irregular combination of resource elements includes a first group of resource elements associated with a first set of time slots and a first set of frequency symbols and a second group of resource elements associated with a second set of time slots and a second set of frequency symbols.

Aspect 3: The method of any one of aspects 1 or 2, wherein the first group includes one or more resource elements and the second group includes one or more resource elements that are different than the one or more resource elements in the first group.

Aspect 4: The method of any one of aspects 1 to 3, wherein the first group includes a plurality of resource elements.

Aspect 5: The method of any one of aspects 1 to 4, wherein the second group includes a plurality of resource elements.

Aspect 6: The method of any one of aspects 1 to 5, wherein the first group includes a first plurality of resource elements and wherein the second group includes a second plurality of resource elements.

Aspect 7: The method of any one of aspects 1 to 6, wherein the first group and the second group are separated in at least one of a time domain and a frequency domain.

Aspect 8: The method of any one of aspects 1 to 7, wherein the overlay code is determined using a machine learning model.

Aspect 9: The method of any one of aspects 1 to 8, wherein the receiving device is a user equipment and the transmitting device is a base station.

Aspect 10: The method of any one of aspects 1 to 8, wherein the receiving device is a base station and the transmitting device is user equipment.

Aspect 11: The method of any one of aspects 1 to 10, wherein communicating the information associated with the transmission of the reference signal further includes transmitting, by the receiving device, the tone pattern and the overlay code to the transmitting device to be used for transmission of the reference signal by the transmitting device.

Aspect 12: The method of any one of aspects 1 to 11, wherein the tone pattern is transmitted, during uplink transmission, over one or more of a Physical Uplink Control Channel (PUCCH), MAC Control Element (MAC-CE), or Radio Resource Control layer.

Aspect 13: The method of any one of aspects 1 to 12, wherein the tone pattern is transmitted, during downlink transmission, over one or more of a Physical Downlink Control Channel (PDCCH), MAC Control Element (MAC-CE), or Radio Resource Control layer.

Aspect 14: The method of any one of aspects 1 to 13, wherein communicating the information associated with the transmission of the reference signal further includes transmitting the reference signal, using the tone pattern and the overlay code, from the receiving device to the transmitting device.

Aspect 15: The method of any one of aspects 1 to 14, wherein the overlay code is determined using a rule, the rule identifying which resource elements of the one or more resource blocks are to be used for the tone pattern relative to pilot resource elements in each of the one or more resource blocks.

Aspect 16: The method of any one of aspects 1 to 15, wherein the reference signal is a Demodulation Reference Signal (DMRS).

Aspect 17: An apparatus for wireless communication includes one or more memories having computer-readable instructions stored therein, and one or more processors, the one or more processors are configured to execute the computer-readable instructions to determine a tone pattern for a reference signal for use in wireless communications between the apparatus and a transmitting device, the tone pattern including an irregular combination of resource elements in one or more resource blocks for the reference signal, wherein the resource elements are shared by a plurality of antennas for communication of one or more reference signals between at least the transmitting device and the receiving device; determine an overlay code for the tone pattern; and communicate information associated with transmission of the reference signal using the tone pattern and the overlay code.

Aspect 18: The apparatus of aspect 17, wherein the irregular combination of resource elements includes a first group of resource elements associated with a first set of time slots and a first set of frequency symbols and a second group of resource elements associated with a second set of time slots and a second set of frequency symbols.

Aspect 19: The apparatus of any one of aspects 17 or 18, wherein the first group includes one or more resource elements and the second group includes one or more resource elements that are different than the one or more resource elements in the first group.

Aspect 20: The apparatus of any one of aspects 17 to 19, wherein the first group includes a plurality of resource elements.

Aspect 21: The apparatus of any one of aspects 17 to 20, wherein the second group includes a plurality of resource elements.

Aspect 22: The apparatus of any one of aspects 17 to 21, wherein the first group includes a first plurality of resource elements and wherein the second group includes a second plurality of resource elements.

Aspect 23: The apparatus of any one of aspects 17 to 22, wherein the first group and the second group are separated in at least one of a time domain and a frequency domain.

Aspect 24: The apparatus of any one of aspects 17 to 23, wherein the one or more processors are further configured to execute the computer-readable instructions to determine the overlay code using a machine learning model.

Aspect 25: The apparatus of any one of aspects 17 to 24, wherein the apparatus is a user equipment and the transmitting device is a base station.

Aspect 26: The apparatus of any one of aspects 17 to 24, wherein the apparatus is a base station and the transmitting device is user equipment.

Aspect 27: The apparatus of any one of aspects 17 to 26, wherein to communicate the information associated with transmission of the reference signal, the one or more processors are further configured to execute the computer-readable instructions to transmit the tone pattern and the overlay code to the transmitting device to be used for transmission of the reference signal by the transmitting device.

Aspect 28: The apparatus of any one of aspects 17 to 27, wherein the tone pattern is transmitted, during uplink transmission, over one or more of a Physical Uplink Control Channel (PUCCH), MAC Control Element (MAC-CE), or Radio Resource Control layer.

Aspect 29: The apparatus of any one of aspects 17 to 28, wherein the tone pattern is transmitted, during downlink transmission, over one or more of a Physical Downlink Control Channel (PDCCH), MAC Control Element (MAC-CE), or Radio Resource Control layer.

Aspect 30: The apparatus of any one of aspects 17 to 29, wherein the one or more processors are further configured to execute the computer-readable instructions to facilitate the transmission of the reference signal by transmitting, to the transmitting device, the reference signal using the tone pattern and the overlay code.

Aspect 31: The apparatus of any one of aspects 17 to 30, wherein the overlay code is determined using a rule, the rule identifying which resource elements of the one or more resource blocks are to be used for the tone pattern relative to one or more pilot resource elements in each of the one or more resource blocks.

Aspect 32: The apparatus of any one of aspects 17 to 31, wherein the reference signal is a Demodulation Reference Signal (DMRS).

Aspect 33: One or more non-transitory computer-readable media including computer-readable instructions stored therein, which when executed by one or more processors, cause the one or more processors to perform operations according to any of aspects 1 to 16.

Aspect 34: An apparatus including means for performing operations according to any of aspects 1 to 16.

Aspect 35: A method for wireless communication includes determining, by a user equipment, a tone pattern for a reference signal for use in wireless communications between the user equipment and a base station, the tone pattern including an irregular combination of resource elements in one or more resource blocks for the reference signal, wherein the resource elements are shared by a plurality of antennas for communication of one or more reference signals between at least the user equipment and the base station; transmitting, by the user equipment, the tone pattern to the base station; receiving, by the user equipment from the base station, an overlay code for the tone pattern; and communicating, by the user equipment, the reference signal using the tone pattern and the overlay code.

Aspect 36: The method of aspect 35, wherein the overlay code is determined based on a rule, the rule identifying which resource elements of the one or more resource blocks are to be used for the tone pattern relative to pilot resource elements in each of the one or more resource blocks.

Aspect 37: An apparatus for wireless communication includes one or more memories having computer-readable instructions stored therein and one or more processors. The one or more processors are configured to execute the computer-readable instructions to determine a tone pattern for a reference signal for use in wireless communications between the apparatus and a base station, the tone pattern including an irregular combination of resource elements in one or more resource blocks for the reference signal, wherein the resource elements are shared by a plurality of antennas for communication of one or more reference signals between at least the apparatus and the base station; transmit the tone pattern to the base station; receive, from the base station, an overlay code for the tone pattern; and communicate the reference signal using the tone pattern and the overlay code.

Aspect 38: The apparatus of aspect 37, wherein the overlay code is determined based on a rule, the rule identifying which resource elements of the one or more resource blocks are to be used for the tone pattern relative to pilot resource elements in each of the one or more resource blocks.

Aspect 39: One or more non-transitory computer-readable media including computer-readable instructions stored therein, which when executed by one or more processors, cause the one or more processors to perform operations according to any of aspects 35 to 36.

Aspect 40: An apparatus including means for performing operations according to any of aspects 35 to 36.

Aspect 41: One or more non-transitory computer-readable media including computer-readable instructions stored therein, which when executed by one or more processors, cause the one or more processors to perform operations according to any of aspects 1 to 16 and 35 to 36.

Aspect 42: An apparatus including means for performing operations according to any of aspects 1 to 16 and 35 to 36.

What is claimed is:

1. A method of wireless communication performed by a user equipment (UE), the method comprising:
   determining one or more channel conditions associated with a channel;

determining, based on the one or more channel conditions associated with the channel, a tone pattern for a reference signal for use in wireless communications via the channel between the UE and a network device, the tone pattern including an irregular combination of resource elements in one or more resource blocks for the reference signal, wherein the resource elements are shared by a plurality of antennas for communication of one or more reference signals via the channel between at least the network device and the UE, the one or more channel conditions of the channel related to at least one of a quality of the channel, a congestion of the channel, a mobility condition of at least one of the UE or the network device, transmission and reception capabilities of at least one of the UE or the network device, or environmental conditions;

determining an overlay code for the tone pattern; and communicating information associated with transmission of the reference signal using the tone pattern and the overlay code.

2. The method of claim 1, wherein the irregular combination of resource elements includes a first group of resource elements associated with a first set of time slots and a first set of frequency symbols and a second group of resource elements associated with a second set of time slots and a second set of frequency symbols.

3. The method of claim 2, wherein the first group includes one or more resource elements and the second group includes one or more resource elements that are different than the one or more resource elements in the first group.

4. The method of claim 3, wherein the first group includes a plurality of resource elements.

5. The method of claim 3, wherein the second group includes a plurality of resource elements.

6. The method of claim 3, wherein the first group includes a first plurality of resource elements and wherein the second group includes a second plurality of resource elements.

7. The method of claim 2, wherein the first group and the second group are separated in at least one of a time domain and a frequency domain.

8. The method of claim 1, wherein the overlay code is determined using a machine learning model.

9. The method of claim 1, wherein the network device is a base station.

10. The method of claim 1, wherein communicating the information associated with the transmission of the reference signal further comprises:

transmitting the tone pattern and the overlay code to the network device to be used for transmission of the reference signal by the network device.

11. The method of claim 1, wherein communicating the information associated with the transmission of the reference signal further comprises:

transmitting the reference signal, using the tone pattern and the overlay code, from the UE to the network device.

12. The method of claim 1, wherein the overlay code is determined using a rule, the rule identifying which resource elements of the one or more resource blocks are to be used for the tone pattern relative to pilot resource elements in each of the one or more resource blocks.

13. The method of claim 1, wherein the reference signal is a Demodulation Reference Signal (DMRS).

14. A user equipment (UE) for wireless communication, the UE comprising:

one or more memories having computer-readable instructions stored therein; and one or more processors configured to execute the computer-readable instructions to:

determine one or more channel conditions associated with a channel;

determine, based on the one or more channel conditions associated with the channel, a tone pattern for a reference signal for use in wireless communications via the channel between the UE and a network device, the tone pattern including an irregular combination of resource elements in one or more resource blocks for the reference signal, wherein the resource elements are shared by a plurality of antennas for communication of one or more reference signals via the channel between at least the network device and the UE, the one or more channel conditions of the channel related to at least one of a quality of the channel, a congestion of the channel, a mobility condition of at least one of the UE or the network device, transmission and reception capabilities of at least one of the UE or the network device, or environmental conditions;

determine an overlay code for the tone pattern; and communicate information associated with transmission of the reference signal using the tone pattern and the overlay code.

15. The UE of claim 14, wherein the irregular combination of resource elements includes a first group of resource elements associated with a first set of time slots and a first set of frequency symbols and a second group of resource elements associated with a second set of time slots and a second set of frequency symbols.

16. The UE of claim 15, wherein the first group includes one or more resource elements and the second group includes one or more resource elements that are different than the one or more resource elements in the first group.

17. The UE of claim 16, wherein the first group includes a plurality of resource elements.

18. The UE of claim 16, wherein the second group includes a plurality of resource elements.

19. The UE of claim 16, wherein the first group includes a first plurality of resource elements and wherein the second group includes a second plurality of resource elements.

20. The UE of claim 15, wherein the first group and the second group are separated in at least one of a time domain and a frequency domain.

21. The UE of claim 14, wherein the one or more processors are further configured to execute the computer-readable instructions to:

determine the overlay code using a machine learning model.

22. The UE of claim 14, wherein the network device is a base station.

23. The UE of claim 14, wherein, to communicate the information associated with transmission of the reference signal, the one or more processors are further configured to execute the computer-readable instructions to:

transmit the tone pattern and the overlay code to the network device to be used for transmission of the reference signal by the network device.

24. The UE of claim 14, wherein, to facilitate transmission of the reference signal, the one or more processors are further configured to execute the computer-readable instructions to:

transmit, to the network device, the reference signal using the tone pattern and the overlay code.

25. A method of wireless communication performed by a user equipment (UE), the method comprising:

determining one or more channel conditions associated with a channel;

determining, based on the one or more channel conditions associated with the channel, a tone pattern for a reference signal for use in wireless communications via the channel between the user equipment and a base station, the tone pattern including an irregular combination of resource elements in one or more resource blocks for the reference signal, wherein the resource elements are shared by a plurality of antennas for communication of one or more reference signals via the channel between at least the user equipment and the base station, the one or more channel conditions of the channel related to at least one of a quality of the channel, a congestion of the channel, a mobility condition of the user equipment, transmission and reception capabilities of at least one of the user equipment or the base station, or environmental conditions;

transmitting the tone pattern to the base station;

receiving, from the base station, an overlay code for the tone pattern; and communicating the reference signal using the tone pattern and the overlay code.

26. The method of claim 25, wherein the overlay code is determined based on a rule, the rule identifying which resource elements of the one or more resource blocks are to be used for the tone pattern relative to pilot resource elements in each of the one or more resource blocks.

27. A user equipment (UE) for wireless communication, the UE comprising:

one or more memories having computer-readable instructions stored therein; and one or more processors configured to execute the computer-readable instructions to:

determine one or more channel conditions associated with a channel;

determine, based on the one or more channel conditions associated with the channel, a tone pattern for a reference signal for use in wireless communications via the channel between the UE and a base station, the tone pattern including an irregular combination of resource elements in one or more resource blocks for the reference signal, wherein the resource elements are shared by a plurality of antennas for communication of one or more reference signals via the channel between at least the UE and the base station, the one or more channel conditions of the channel related to at least one of a quality of the channel, a congestion of the channel, a mobility condition of the UE, transmission and reception capabilities of at least one of the UE or the base station, or environmental conditions;

transmit the tone pattern to the base station;

receive, from the base station, an overlay code for the tone pattern; and communicate the reference signal using the tone pattern and the overlay code.

28. The UE of claim 27, wherein the overlay code is determined based on a rule, the rule identifying which resource elements of the one or more resource blocks are to be used for the tone pattern relative to pilot resource elements in each of the one or more resource blocks.

29. The method of claim 25, wherein the overlay code is determined using a machine learning model.

30. The UE of claim 27, wherein the overlay code is determined using a machine learning model.

* * * * *